US007060972B2

(12) United States Patent
Hager

(10) Patent No.: US 7,060,972 B2
(45) Date of Patent: Jun. 13, 2006

(54) TRIPLE QUADRUPOLE MASS SPECTROMETER WITH CAPABILITY TO PERFORM MULTIPLE MASS ANALYSIS STEPS

(75) Inventor: James W. Hager, Mississauga (CA)

(73) Assignee: MDS Inc., Concord (CA)

( * ) Notice: Subject to any disclaimer, the term of this patent is extended or adjusted under 35 U.S.C. 154(b) by 55 days.

(21) Appl. No.: 10/834,214

(22) Filed: Apr. 29, 2004

(65) Prior Publication Data

US 2005/0006580 A1 Jan. 13, 2005

Related U.S. Application Data

(63) Continuation-in-part of application No. 10/312,569, filed as application No. PCT/CA01/00947 on Jun. 26, 2001, now abandoned, and a continuation-in-part of application No. 09/864,878, filed on May 25, 2001, now Pat. No. 6,720,554.

(60) Provisional application No. 60/219,684, filed on Jul. 21, 2000.

(51) Int. Cl.
*B01D 59/44* (2006.01)
*H01J 49/00* (2006.01)

(52) U.S. Cl. ...................................... 250/282; 250/283

(58) Field of Classification Search ................ 250/282, 250/290, 292, 283
See application file for complete search history.

(56) References Cited

U.S. PATENT DOCUMENTS 4,952,803 A 8/1990 Matsuda
6,015,972 A 1/2000 Hager
6,111,250 A 8/2000 Thomson et al.

(Continued)

FOREIGN PATENT DOCUMENTS

WO WO 97/47025 12/1997

(Continued)

OTHER PUBLICATIONS

L. Cousins et al., "Efficient Multiple Fragmentation (MSnth) Using Resonance Excitation in Flow Through RF Quadruople Ion Guides", 47th ASMS Conference, 1999.

(Continued)

*Primary Examiner*—Nikita Wells
*Assistant Examiner*—David A. Vanore
(74) *Attorney, Agent, or Firm*—Bereskin & Parr

(57) ABSTRACT

A method of analyzing a substance comprises ionizing the substance to form a string of ions. The ions are then subject to a first mass analysis step. In one embodiment, the ions are accelerated into a collision cell in known manner to form primary fragment ions. These primary fragment ions are then accelerated into a downstream mass analyzer, to promote secondary fragmentation. In another embodiment of the invention, ions are passed through the collision cell, without fragmentation, and then accelerated from the collision cell into a low pressure section, which may be a mass analyzer or a rod set for collecting and collimating ions. This is done under conditions that promote fragmentation. The operating conditions of the low pressure section can be such as to promote collection or retention of ions depending upon their mass, and more specifically to reject low mass ions. This enables primary fragment ions to be cooled, and secondary fragment ions to be formed subsequently from these ions after they have disipated some of their energy. This enables control of secondary fragmentation processes, and offers numerous opportunities for analyzing complex ions.

23 Claims, 17 Drawing Sheets

U.S. PATENT DOCUMENTS

| | | | |
|---|---|---|---|
| 6,166,378 | A | 12/2000 | Thomson et al. |
| 6,177,668 | B1 | 1/2001 | Hager |
| 6,194,717 | B1 | 2/2001 | Hager |
| 6,285,027 | B1 | 9/2001 | Chernushevich et al. |
| 6,331,702 | B1 | 12/2001 | Krutchinsky et al. |
| 6,489,609 | B1 | 12/2002 | Baba et al. |
| 6,504,148 | B1 | 1/2003 | Hager |
| 6,528,784 | B1 | 3/2003 | Tang et al. |
| 6,534,764 | B1 | 3/2003 | Verentchikov et al. |
| 6,720,554 | B1 * | 4/2004 | Hager ........................ 250/282 |
| 2002/0175278 | A1 | 11/2002 | Whitehouse |
| 2003/0042415 | A1 | 3/2003 | Hager |

FOREIGN PATENT DOCUMENTS

| | | |
|---|---|---|
| WO | WO 99/30350 | 6/1999 |
| WO | WO 00/33350 | 6/2000 |
| WO | WO 00/73750 | 12/2000 |
| WO | WO 01/78106 | 10/2001 |

OTHER PUBLICATIONS

B.A. Thomson et al., "Improved Collisionally Activated Dissociation Efficiency and Mass Resolution on a Triple Quadrupole Mass Spectrometer System", Analytical Chemistry, vol. 67, No. 10, pp. 1696-1704.

Hopfgartner, et al., "Fragmentation of Bosentan (Ro 47-0203) in Ionspray Mass Spectrometry After Collision-Induced Dissociation at Low Energy: a Case of Radical Fragmentation of an Even-electron Ion", Journal of Mass Spectrometry, vol. 31, 69-76 (1996), pp. 69-76.

* cited by examiner

TRIPLE QUADRUPOLE MASS SPECTROMETER WITH CAPABILITY TO PERFORM MULTIPLE MASS ANALYSIS STEPS

CONTINUATION-IN-PART APPLICATION INFORMATION

This application is a continuation-in-part of application Ser. No. 10/312,569 filed on Jan. 14, 2003 now abandoned.

FIELD OF THE INVENTION

This invention relates to mass spectrometers. More particularly, this invention relates to tandem mass spectrometers, intended to perform multiple mass analysis or selection steps.

BACKGROUND OF THE INVENTION

Presently, a variety of mass spectrometry/mass spectrometry (MS/MS or $MS^2$) techniques are known. These techniques provide for detection of ions that have undergone physical changes during residence in a mass spectrometer. Frequently, the physical change involves inducing fragmentation of a selected precursor ion and recording the mass spectrum of the resultant fragment ions. The information in the fragment ion mass spectrum is often a useful aid in elucidating the structure of the precursor ion. The general approach used to obtain an MS/MS spectrum is to mass select the chosen precursor ion with a suitable m/z analyzer, to subject the precursor ion to energetic collisions with a neutral atom or molecule that induces dissociation, and finally to mass resolve the fragment ions again with a m/z analyzer.

Triple quadrupole mass spectrometers (TQMS) accomplish these steps through the use of two quadrupole mass analyzers separated by a pressurized reaction region for the fragmentation step. Since the three steps of the MS/MS process are carried out in different locations, MS/MS using a triple quadrupole mass spectrometer is referred to as "tandem in space". MS/MS spectra with a TQMS can be quite complex in terms of the number of mass resolved features due to the tens of electron volts laboratory collision energies used and the fact that once a fragment ion is formed it can undergo further decomposition producing additional second generation ions and so on. The resulting MS/MS spectrum is a composite of all the fragmentation processes that are energetically allowed: precursor ion to fragment ions and fragment ions to other fragment ions. This spectral richness is often a benefit to compound identification when searching databases of MS/MS libraries. However, this same spectral complexity can make structural identification of a completely unknown compound difficult since not all of the fragment ions in the spectrum are first generation products from the precursor ion.

There are also situations in which the MS/MS spectrum yields only one or two fragment ion features that correspond to loss of a structurally insignificant part of the precursor ion. The data from these MS/MS spectra are not particularly helpful for determining the structure of unknown precursor ions.

An additional stage of MS applied to the MS/MS scheme outlined above, giving MS/MS/MS or $MS^3$, can be a useful tool for both of the problems outlined above. When the $MS^2$ spectrum is very rich in fragment ion peaks the technique of subsequently mass isolating a particular fragment ion, dissociating a selected fragment ion, and mass resolving the resultant ions helps to clarify the dissociation pathways of the original precursor ion. It also aids in accounting for the mechanism of formation of all of the mass peaks in the $MS^2$ spectrum. In the case in which the $MS^2$ spectrum is dominated by primary fragment ions with little structural information, $MS^3$ offers the opportunity to break down these primary fragmentation ions, to generate additional or secondary fragment ions that often yield the information of interest.

Three-dimensional ion traps provide the capability of multiple stages of MS/MS (often referred to as $MS^n$ since n stages of MS can be carried out). Since the precursor ion isolation, fragmentation, and subsequent mass analysis is performed in the same spatial location, any number of MS steps can be performed, with the practical limitation being losses and diminution of the total number of ions retained after each step. Typically, an ion trap is operated to cause all of the unwanted ions to become unstable in the trapping volume, so as to isolate a precursor ion. Next, the trapping conditions are modified such that a range of fragment ions will be created and trapped in the device. For this purpose, the precursor ion is collisionally activated by application of an AC excitation frequency that increases the ion's kinetic energy in the presence of a neutral gas such as helium. These low energy collisions result in fragment ion generation. Finally, the fragment ions can be mass selectively scanned out of the three-dimensional ion trap toward an ion detector. Further stages of MS/MS are accomplished by simply repeating the mass isolation and collisional activation steps prior to scanning the ions out of the ion trap.

In U.S. Pat. No. 5,420,425, there is disclosed an ion trap mass spectrometer that mass selectively ejects trapped ions in a radial direction. The contents of patent are hereby incorporated by reference.

The technique disclosed in that patent relies upon establishing a quadrupole field in the trapping chamber to trap ions within a predetermined range of mass-to-charge ratios. The trapped ions of specific masses become unstable and leave the trapping chamber in a radial direction. The ejected ions can then be detected.

True $MS^3$ experiments are difficult to accomplish with TQMS instruments since there are only two mass analyzers and one collisional activation region. Additional fragmentation steps can be carried out within the RF-only collision cell by applying an appropriate AC excitation frequency to the quadrupole rods such that a particular fragment ion is activated and dissociates further. But since TQMS instruments are normally operated as flow-through devices there is usually insufficient time to isolate a particular ion and to collisionally activate it during the brief time it is resident in the RF-only collision cell.

An additional stage of fragmentation within a flow-through pressurized collision cell, but without the isolation step has been demonstrated for a QqTOF instrument as described by Cousins [47th ASMS Conference on Mass Spectrometry and Allied Topics, 1999]. Here, a precursor ion is selected within the first quadrupole mass analyzer, and then accelerated into the collision cell where primary fragment ions are produced. Further fragmentation of a selected primary fragmentation is induced by an appropriately chosen AC voltage source that is resonant with the particular, primary, fragment ion. This excited primary fragment ion then undergoes further collisions with background neutral species and dissociates, to generate secondary fragment ions. The result is a $MS^3$ spectrum superimposed upon the $MS^2$ spectrum, which complicates data analysis. This can be partially overcome by subtracting the $MS^2$ spectrum from the $MS^2$+$MS^3$ spectra, but this approach can be time consuming and may discriminate against important low intensity $MS^3$ spectral features.

An alternative approach is to trap the ions within the collision cell and this offers the opportunity to both isolate and fragment a chosen ion using techniques analogous to those used in a conventional three-dimensional ion trap. Theoretically, this should overcome the flow through characteristics, resulting in insufficient time for additional fragmentation, noted above. The problem with this approach is that once the ions are released from the collision cell the downstream mass spectrometer must perform the mass analysis step very quickly since the pulse of released ions is temporally very narrow. This requires that the downstream mass analyzer be a very fast scanning device, such as a TOF mass spectrometer.

Thus, a conventional scanning quadrupole mass analyzer or the like is unsuited for processing a temporally narrow pulse of ions. If the ions could somehow be scanned out of the trap in some mass-dependent manner, this difficulty could be overcome.

In earlier U.S. Pat. No. 6,177,668, also published international application WO 97/4702, there is disclosed a multipole mass spectrometer provided with ion trap and an axial ejection technique from the ion trap. The contents of these two applications are hereby incorporated by reference.

The technique disclosed in those two applications, relies upon admitting ions into the entrance of a rod set, for example a quadrupole rod set, and trapping the ions at the far end by producing a barrier field at an exit member. An RF field is applied to the rods, at least adjacent to the barrier member, and the RF fields interact in an extraction region adjacent to the exit end of the rod set and the barrier member, to produce a fringing field. Ions in the extraction region are energized to eject, mass selectively, at least some ions of a selected mass-to-charge ratio axially from the rod set and past the barrier field. The ejected ions can then be detected. Various techniques are taught for ejecting the ions axially, namely scanning an auxiliary AC field applied to the end lens or barrier, scanning the RF voltage applied to the rod set while applying a fixed frequency auxiliary voltage to the end barrier and applying an auxiliary AC voltage to the rod set in addition to that on the lens and the RF on the rods.

It has now been realized that this 2-dimensional linear ion trap mass spectrometer can be used to enhance the performance of a triple quadrupole to provide $MS^3$ capabilities.

SUMMARY OF THE INVENTION

In accordance with a first aspect of the present invention, there is provided a method of analyzing a substance, the method comprising:

(1) ionizing the substance to form a stream of ions;

(2) subjecting the ions stream to a first mass analysis, to select ions having a desired mass to charge ratio, as precursor ions;

(3) introducing the precursor ions into a collision cell to promote fragmentation of the precursor ions, thereby to generate primary fragment ions;

(4) in the collision cell, selecting primary fragment ions having a desired mass to charge ratio, and rejecting other ions;

(5) accelerating the selected primary fragment ions from the collision cell into a downstream linear ion trap mass analyzer, thereby to promote secondary fragmentation; and (6) scanning ions out of the linear ion trap downstream mass analyzer to generate a mass spectrum.

In accordance with a second aspect of the present invention, there is provided a method of analyzing a substance, the method comprising:

(1) ionizing the substance to form a stream of ions;

(2) subjecting the ions stream to a first mass analysis, to select ions having a desired mass to charge ratio, as precursor ions;

(3) introducing the precursor ions into a collision cell to promote fragmentation of the precursor ions, thereby to generate primary fragment ions;

(4) in the collision cell, selecting primary fragment ions having a desired mass to charge ratio, and rejecting other ions by removing ions of a mass to charge ratio greater than the mass to charge ratio of the selected primary fragment ions and separately removing ions with a mass to charge ratio less than the mass to charge ratio of the selected primary fragment ion, the removal of the ions with mass to charge ratios higher and lower than the mass to charge ratio of the selected primary fragment ion being effected in either order;

(5) accelerating ions from the collision cell into a downstream mass analyzer, thereby to promote secondary fragmentation; and (6) scanning ions out of the downstream mass analyzer by a radial ejection technique.

BRIEF DESCRIPTION OF THE DRAWINGS

For a better understanding of the present invention and to show more clearly how it may be carried into effect, reference will now be made, by way of example, to the accompanying drawings which show a preferred embodiment of the present invention and in which.

DETAILED DESCRIPTION OF THE PREFERRED EMBODIMENTS

Figure 1:
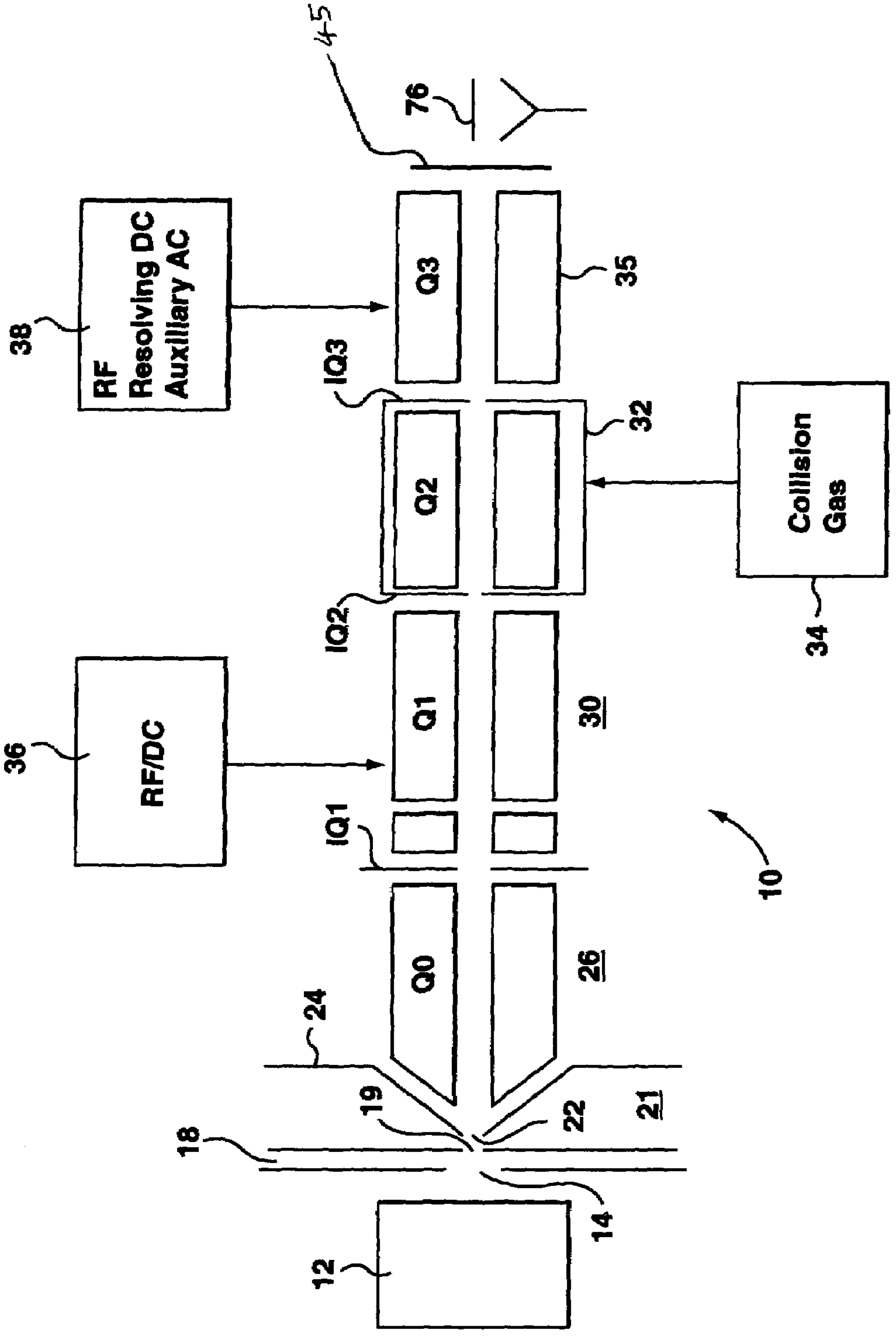
FIG. 1 is a schematic view of an apparatus for carrying out the present invention.

Referring first to FIG. 1, an apparatus in accordance with the present invention is indicated generally by reference 10. In known manner, the apparatus 10 includes an ion source 12, which may be an electrospray, an ion spray, a corona discharge device or any other known ion source. Ions from the ion source 12 are directed through an aperture 14 in an aperture plate 16. On the other side of the plate 16, there is a curtain gas chamber 18, which is supplied with curtain gas from a source (not shown). The curtain gas can be argon, nitrogen or other inert gas, such as described in U.S. Pat. No. 4,861,988, Cornell Research Foundation Inc., which also discloses a suitable ion spray device, and the contents of this patent are hereby incorporated by reference.

The ions then pass through an orifice 19 in an orifice plate 20 into a differentially pumped vacuum chamber 21. The ions then pass through aperture 22 in a skimmer plate 24 into a second differentially pumped chamber 26. Typically, the pressure in the differentially pumped chamber 21 is of the order of 2 torr and the second differentially pumped chamber 26, often considered to be the first chamber of mass spectrometer, is evacuated to a pressure of about 7 mTorr.

In the chamber 26, there is a standard RF-only multipole ion guide Q0. Its function is to cool and focus the ions, and it is assisted by the relatively high gas pressure present in this chamber 26. This chamber 26 also serves to provide an interface between the atmospheric pressure ion source and the lower pressure vacuum chambers, thereby serving to remove more of the gas from the ion stream, before further processing.

An interquad aperture IQ1 separates the chamber 26 from the second main vacuum chamber 30. In the main chamber 30, there are RF-only rods labeled ST (short for "stubbies", to indicate rods of short axial extent), which serve as a Brubaker lens. A quadrupole rod set Q1 is located in the vacuum chamber 30, and this is evacuated to approximately 1 to $3\times10^{-5}$ torr. A second quadrupole rod set Q2 is located in a collision cell 32, supplied with collision gas at 34. The collision cell is designed to provide an axial field toward the exit end as taught by Thomson and Jolliffe in U.S. Pat. No. 6,111,250. The cell 32 is within the chamber 30 and includes interquad apertures IQ2, IQ3 at either end, and typically is maintained at a pressure in the range $5\times10^{-4}$ to $8\times10^{-3}$ torr, more preferably a pressure of $5\times10^{-3}$ torr. Following Q2 is located a third quadrupole rod set Q3, indicated at 35, and an exit lens 45. The pressure in the Q3 region is nominally the same as that for Q1 namely 1 to $3\times10^{-5}$ torr. A detector 76 is provided for detecting ions exiting through the exit lens 45. Ions may also exit Q3 in a radial direction, and a detector may be provided to detect the ions.

Power supplies 36, for RF and resolving DC, and 38, for RF, resolving DC and auxiliary AC are provided, connected to the quadrupoles Q1, Q2, and Q3. Q1 is a standard resolving RF/DC quadrupole. The RF and DC voltages are chosen to transmit only the precursor ions of interest into Q2. Q2 is supplied with collision gas from source 34 to dissociate precursor ions or fragment them to produce fragment or product ions. Q3 is operated as a linear ion trap mass spectrometer as described in U.S. Pat. No. 6,177,668, i.e. ions are scanned out of Q3 in a mass-dependent manner, using the axial ejection technique taught in that earlier U.S. patent. Ions may also be scanned out of Q3 using a radial ejection technique.

In the preferred embodiment, ions from ion source 12 are directed into the vacuum chamber 30 where the precursor ion m/z is selected by Q1. Following precursor ion mass selection, the ions are accelerated into Q2 by a suitable voltage drop into Q2, inducing fragmentation. These 1st generation fragment ions are trapped within Q2 by a suitable repulsive voltage applied to IQ3. Once trapped the RF voltage applied to the Q2 rods is adjusted such that all ions above a chosen mass are made unstable, that is there a,q values fall outside the normal Mathieu stability diagram. Removal of ions above the mass of a particular ion of interest is facilitated by the addition of a small amount of resolving DC voltage, here 1.8 volts, applied to the Q2 rods. Next the RF is adjusted so that ions below a particular mass are made to be unstable. These two steps can be accomplished very quickly, on the order of 1–3 ms each. The result is a mass isolated ion population, which can be further collisionally activated.

The subsequent collisional activation step can be accomplished as in a conventional three-dimensional ion trap, that is by application of an appropriate resonant AC waveform. This however requires sophisticated electronics and has the additional requirement that the trapping RF voltage be such that the lowest mass fragment ion and the precursor ion are simultaneously stable within Q2.

An alternative technique is to simply accelerate the mass isolated ions in to the subsequent mass analyzer. Since Q2 is operated at elevated neutral gas pressure, say $5\times10^{-3}$ torr, there is a natural gas pressure gradient between IQ3 and the subsequent mass analyzer. If the mass isolated ions within Q2 are accelerated through this pressure gradient into the Q3 linear ion trap there will be a sufficient number of collisions to induce further fragmentation. The result is a $MS^3$ mass spectrum.

Figure 2A:
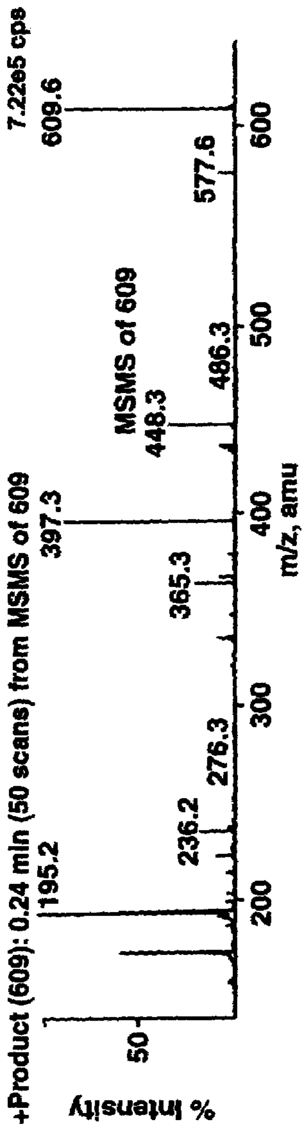
FIG. 2*a* shows an MS/MS spectrum for mass 609 of reserpine.

By way of example consider the following set of experimental results obtained using the apparatus in FIG. 1. A sample of 100 pg/mL of reserpine (MW=608) is introduced into the ion source 12 where it is ionized and directed into the vacuum chamber 30. The RF and DC voltages of Q1 are adjusted to transmit a 0.7 amu wide beam of the protonated reserpine ions at m/z 609 into Q2. The DC voltage offset of Q2 relative to Q1 is chosen to be 35 volts, which is sufficient to produce extensive fragmentation of the reserpine precursor ion. Q2 is operated as a simple accumulation ion trap by adjusting IQ3 to an appropriately repulsive DC voltage so that none of the entering precursor ions or fragment ion generated therein can exit. Q2 is filled for 50 ms, after which the DC voltage applied to IQ2 is raised to the same value as the trapping IQ3 value. There is now a trapped population of primary fragment and residual precursor ions resident within Q2. If all the ions within Q2 are now allowed into the Q3 linear ion trap mass spectrometer and mass analyzed, the $MS^2$ mass spectrum displayed in FIG. 2*a* is obtained. To obtain $MS^3$ data of the m/z 397 ion), this fragment ion must be isolated and collisionally activated prior to mass analysis by the Q3 linear ion trap mass spectrometer.

Figure 2B:
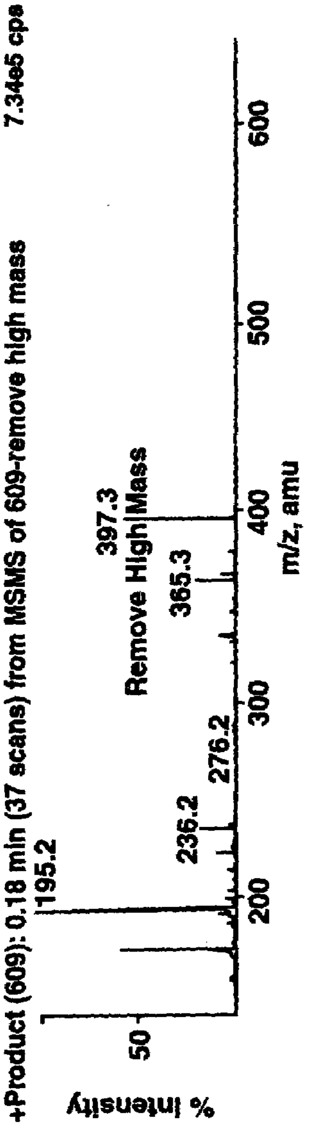
FIGS. 2*b* and 2*c* show the spectrum of FIG. 2*a,* with high masses above mass 397 and low masses below mass 397 removed respectively.

Ion isolation of the m/z 397 fragment ion was accomplished in a step-wise fashion by first adjusting the RF voltage applied to the Q2 rods such that ions above m/z ~397 become unstable within Q2 and are lost. The result of this step is displayed in FIG. 2*b*. Here, one can see that the ion population within Q2 has been modified such that there is little or no contribution to the $MS^2$ mass spectrum from ions m/z>397.

Figure 2C:
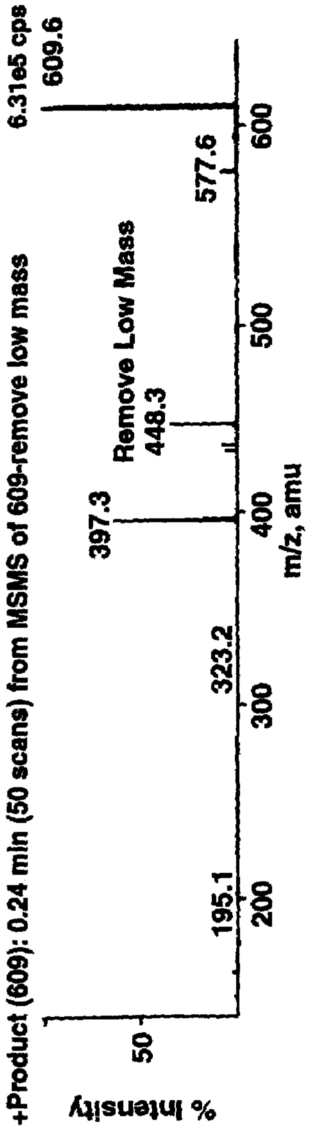

Low mass ions may be eliminated from the Q2 ion population by adjusting the RF voltage such that the trapped ions with m/z below ~397 become unstable in the Q2 and are also lost. The result of this step prior to mass analysis is displayed in FIG. 2*c*, which shows that low mass ions can be effectively eliminated from Q2.

Figure 2D:
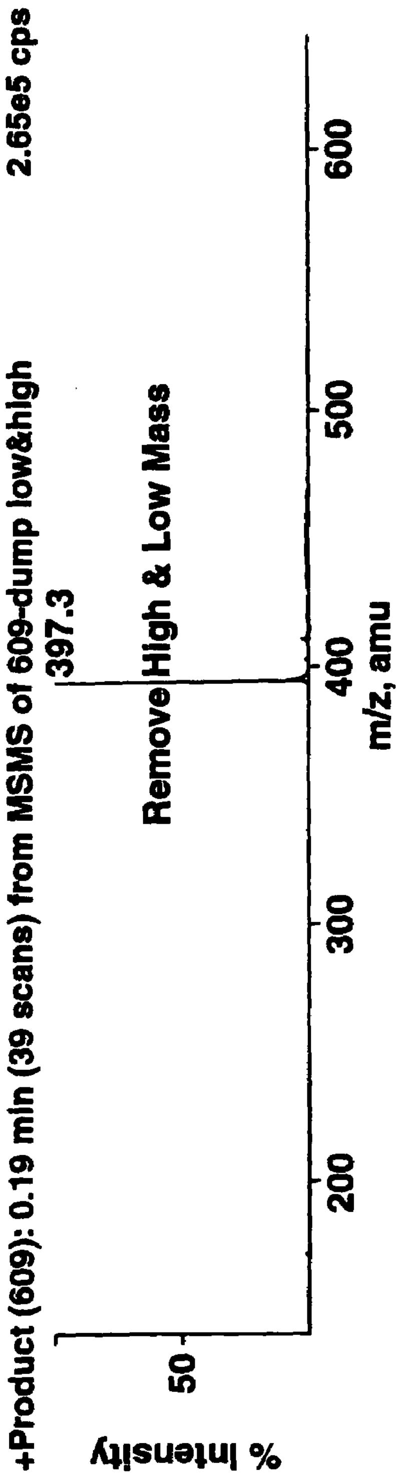
FIG. 2*d* shows the spectrum of FIG. 2*a* with both high and low masses above and below mass 397 removed.
Figure 2E:
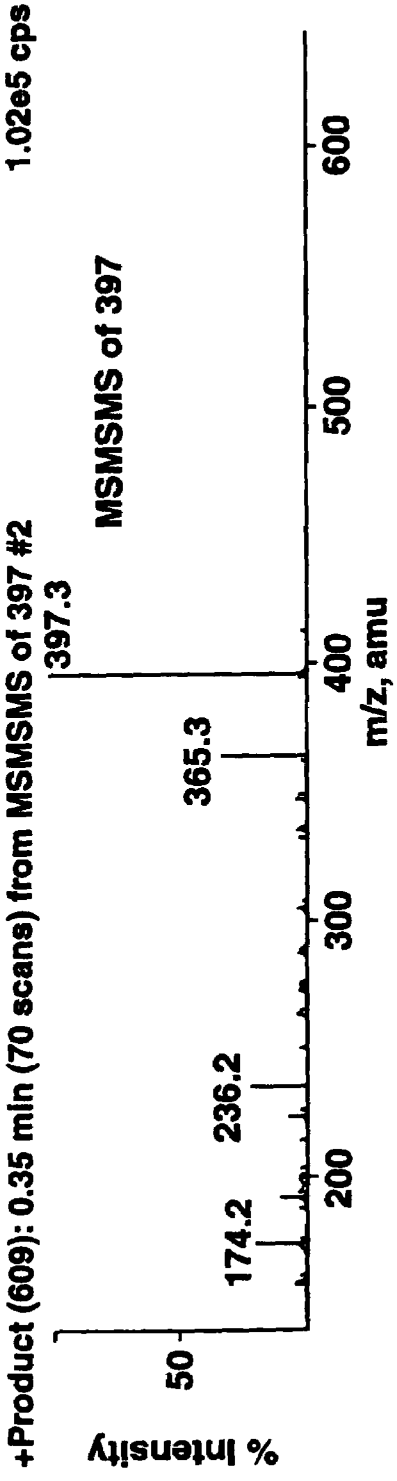
FIG. 2*e* shows an MS/MS/MS spectrum of mass 397 obtained by secondary fragmentation of mass 397 as shown in FIG. 2*d;*
Figures 3A, 3B, 3C:
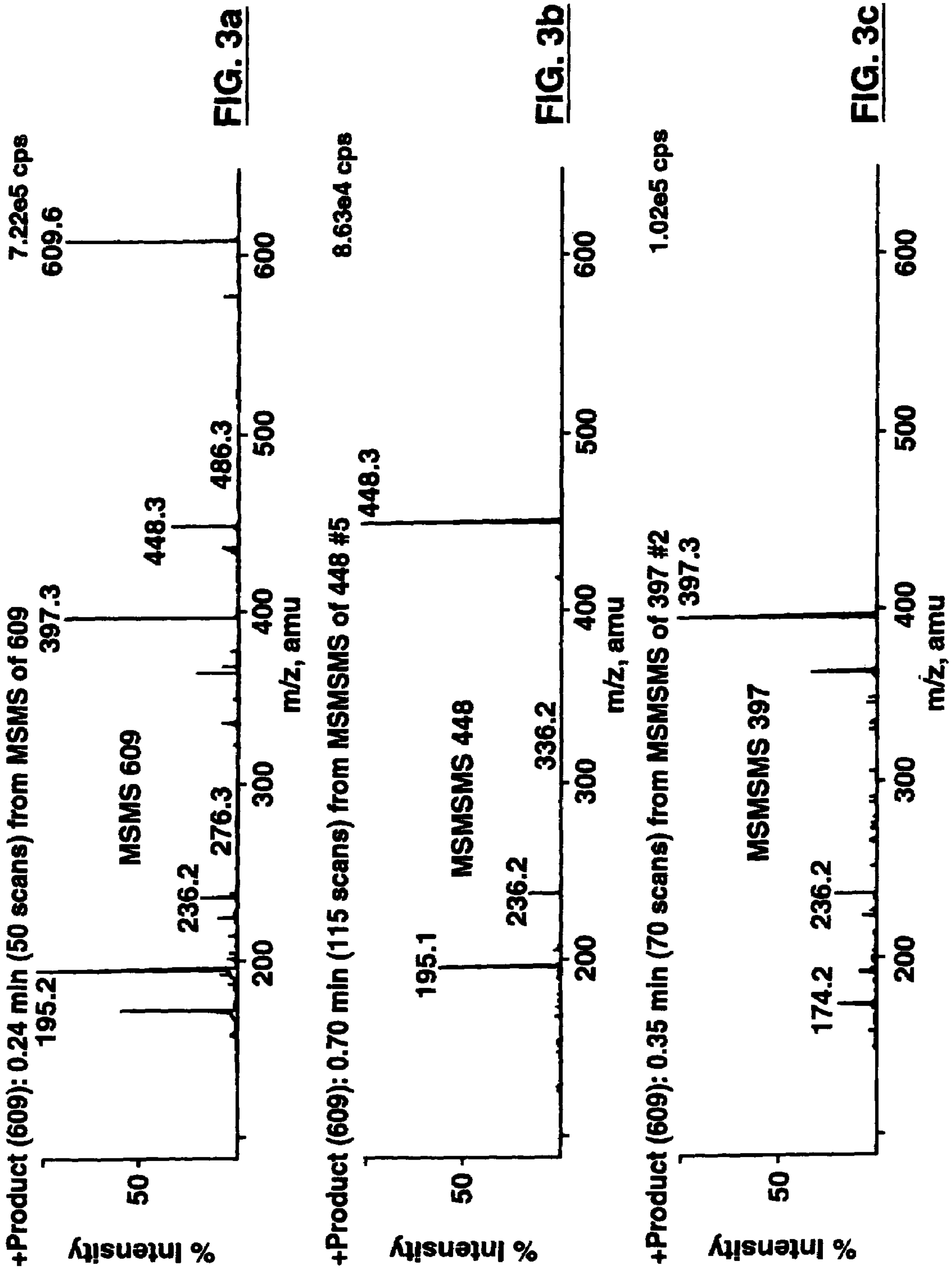
FIG. 3*a* shows the MS/MS spectrum of mass 609, equivalent to FIG. 2*a;*
FIGS. 3*b*–3*e* show MS/MS/MS spectra of the four major ions shown in the spectrum of FIG. 3*a;*
Figure 3D:
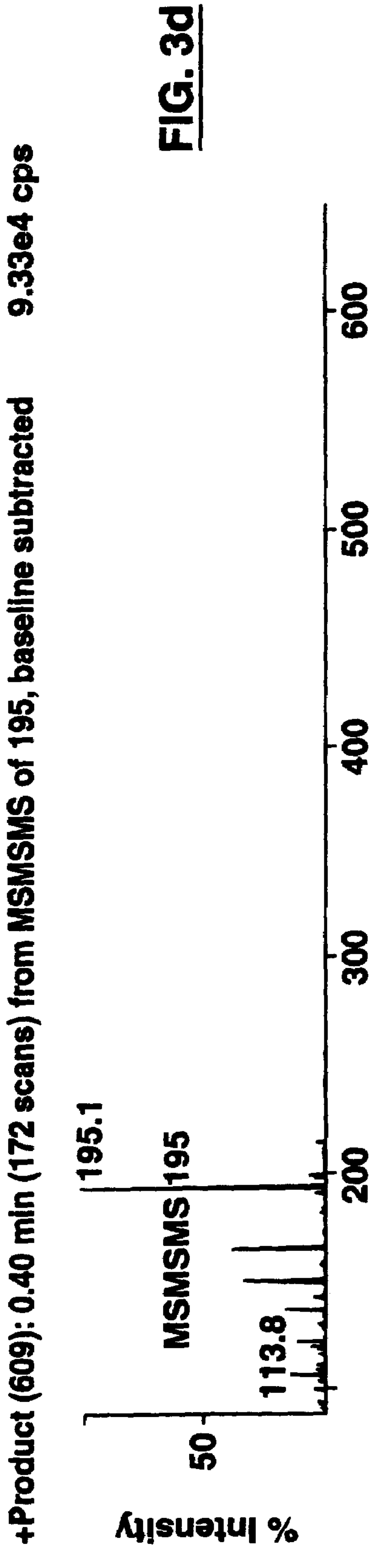
Figure 3E:
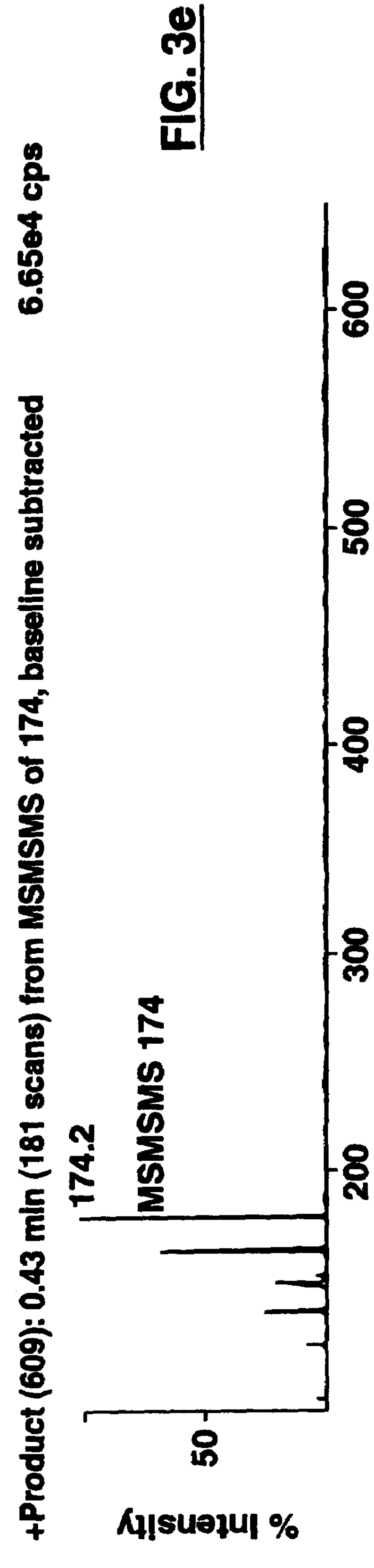

A combination of these two steps thus provides good mass isolation of the m/z 397 fragment ion within Q2 as is displayed in FIG. 2*d*, i.e. these two steps are performed sequentially in Q2. The time penalty for the mass isolation steps is approximately 2×2 ms or a total of 4 ms. As Q2 is a high pressure collision cell, true mass filtering is not possible, and in particular it is not possible to get a sharp cutoff between selected or retained ions, and rejected ions, as is possible in a low pressure mass analysis section, such as Q1. For this reason, it is not possible to apply a narrow window selecting just the desired m/z 397. Any attempt to do this would result in significant loss of the 397 ion. Rather, it has been found that by sequential rejection of masses above and below the mass of interest, the bulk of the unwanted ions can be rejected. Note that in FIGS. 2*a*–2*e*, the vertical scale indicates relative intensity with the most populous ion being indicated as 100%.

Finally, the m/z 397 ions are accelerated into the Q3 linear ion trap MS by increasing the relative DC voltage offset between Q2 and Q3 from 5 volts (used in FIGS. 2*a*–*c*) to 25 volts. Collisions at the exit of Q2 and entrance of Q3 lead to fragmentation of the m/z 397 ions and results in the $MS^3$ spectrum displayed in FIG. 2*d*. As expected, a range of masses of secondary fragmentations, with masses below m/z 397, are present in the spectrum. Again, the vertical axis shows relative intensity, and as the residual primary fragment ion 397 is still the most populous, it is shown with an intensity of 100%, with the secondary fragment ions of low masses shown accordingly.

This procedure can be carried out separately on the major fragment ions in the reference reserpine $MS^2$ spectrum of FIG. 2*a*. The result is displayed in FIG. 3 where the highest mass peak in each spectrum corresponds to the isolated $MS^2$ primary fragment ion used to obtain the $MS^3$ spectrum. Thus, FIG. 3*a* again shows the complete MS2 spectrum for m/z 609; FIGS. 3*b*–3*e* show the $MS^3$ spectra for the primary fragment ions 448, 397 (equivalent to FIG. 2*e*), 195 and 174, respectively.

For this technique to be widely applicable the collisional activation step must be sufficiently energetic to provide a wide range of $MS^3$ fragment ions. The ability to fragment the m/z 609 reserpine ion is a good measure of the energetics of fragmentation since approximately 30 $eV_{lab}$ of energy is required to observe the m/z 174 and 195 ions.

Figure 4:
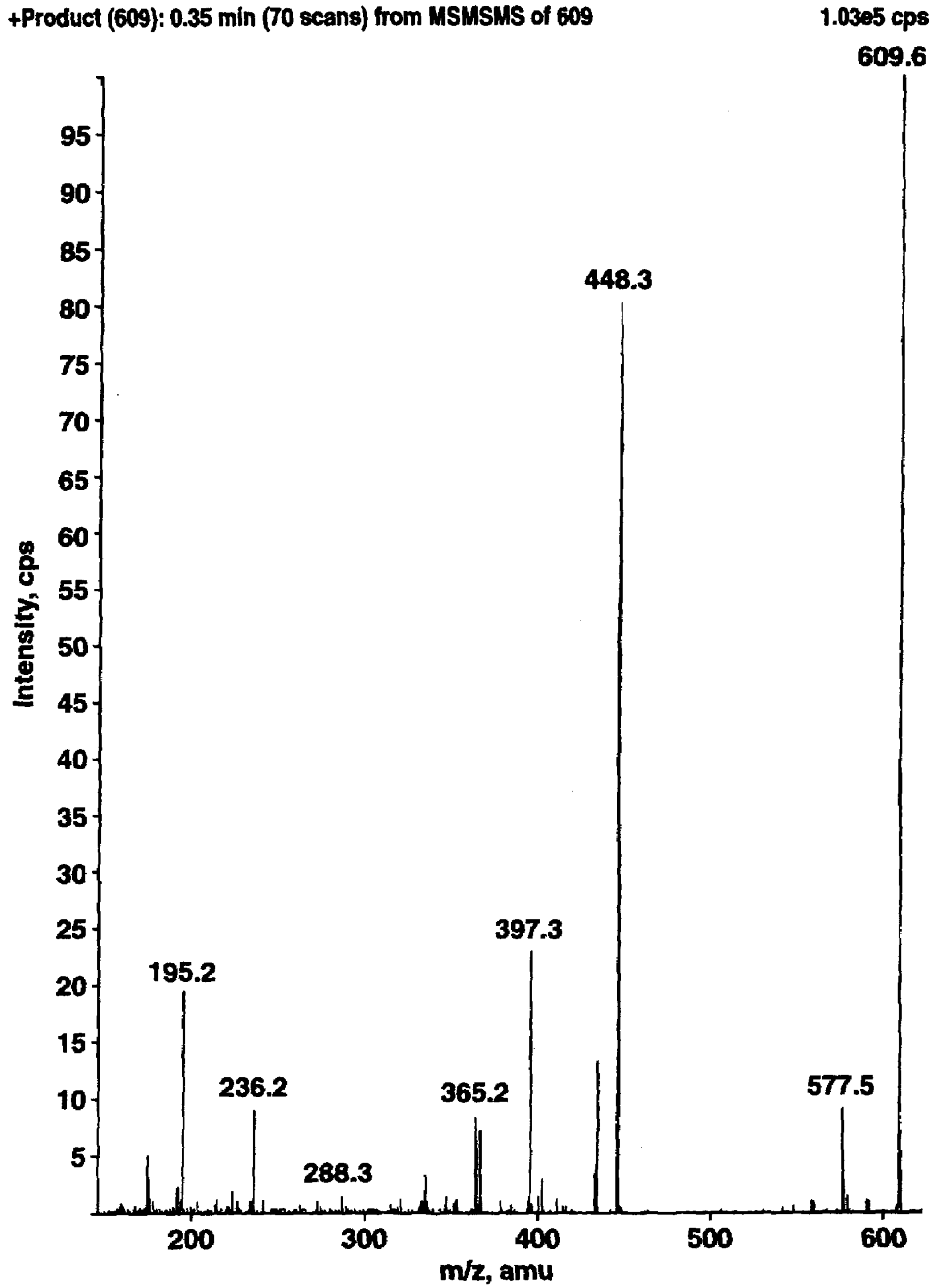
FIG. 4 shows MS/MS/MS of the residual mass 609 ion obtained from the spectrum of FIG. 3*a;*

FIG. 4 shows the $MS^3$ mass spectrum obtained after isolation of the residual m/z 609 ions in Q2, i.e. here the residual precursor ions 609 were retained and all the primary fragment ions were rejected. These residual precursor ions 609 were then subjected to collisional activation using a 30-volt potential drop between Q2 and Q3. One can see that all of the major fragments in the $MS^2$ spectrum (FIG. 2*a*) are present in FIG. 4, although the relative intensities differ, as the relative intensities, in known manner, will vary depending upon variations in the collision energy of the fragmentation process. This demonstrates that the method for obtaining $MS^3$ provides sufficiently energetic collisions to generate fragmentation for many potentially important compounds.

It is understood that the ion isolation step can be accomplished via notched broadband isolation techniques. This entails subjecting the trapped ions to a plurality of excitation signals uniformly spaced in the frequency domain with a notch of no excitation signals corresponding to the resonant frequencies of the ions to be isolated within the ion trap as described by Douglas et al. in WO 00/33350.

Figure 5:
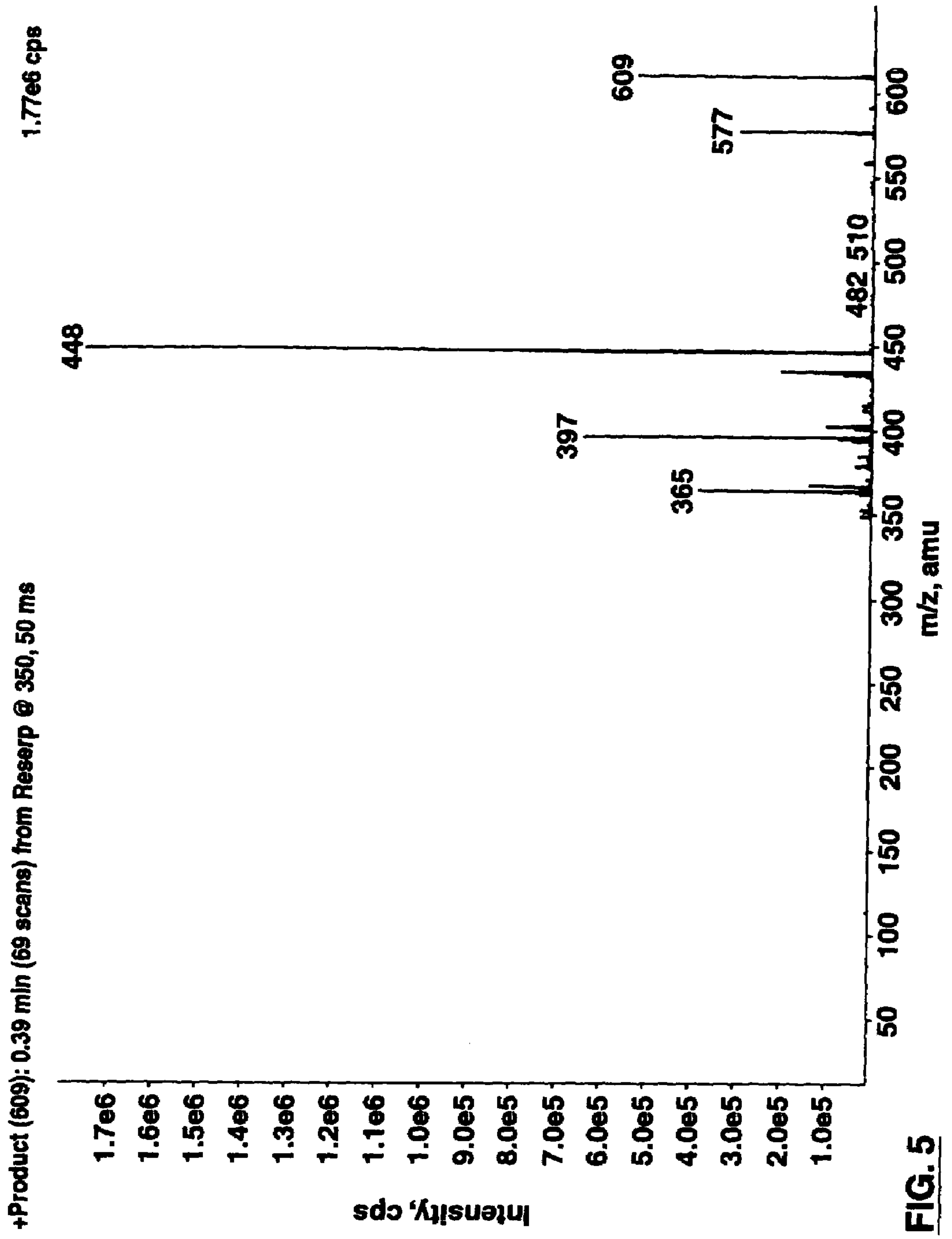
FIG. 5 is an MS/MS spectrum of m/z 609 reserpine molecular ion.

The present inventor has also discovered and identified that one of the important experimental parameters in the transfer of ions from the Q2 linear ion trap to the Q3 linear ion trap is the RF voltage value applied to the Q3 linear ion trap during the Q2-to-Q3 ion acceleration process. Ions received in Q3 can only be successfully trapped within Q3 if their associated q-value is less than ~0.9. FIG. 5 shows that when the reserpine molecular ion at m/z 609 is accelerated from Q2 into Q3 while the RF voltage is set such that only ions with m/z>350 have a q-value <0.9, only product ions with mass-to-charge values greater than 350 are observed in the final mass spectrum. The m/z value associated with the q=0.9 RF voltage during the Q3 fill step is referred to as the "Q3 fill mass"; and while this suggests a single mass, as FIG. 5 shows it really defines a lower limit to a range of masses.

The inventor has found that another important parameter is the time for which the Q3 RF voltage is held at the fill mass, referred to as the "Q3 fill time". This Q3 fill time is in general longer than the actual time required to empty the Q2 ion trap. Ions can be removed from Q2 very rapidly by using an axial DC field as taught by Thomson and Jolliffe in U.S. Pat. No. 6,111,250. At the pressures and voltages used in the current instrument all the ions within Q2 should be transferred to the Q3 ion trap in less than 2 ms, which can be identified as a "transfer time". Any time in excess of this 2 ms or other transfer time but less than the Q3 fill time is referred to as the "delay time".

The Q3 fill time for the experiment that resulted in the spectrum displayed in FIG. 5 was 50 milliseconds (i.e. 2 ms transfer time and 48 ms delay time). If this value is reduced to 5 milliseconds (i.e. 2 ms transfer time and 3 ms delay time) then the mass spectrum in FIG. 6 results. The most obvious difference between the mass spectra in FIGS. 5 and 6 is the appearance of low mass product ions below the Q3 fill mass in FIG. 6.

Figure 6:
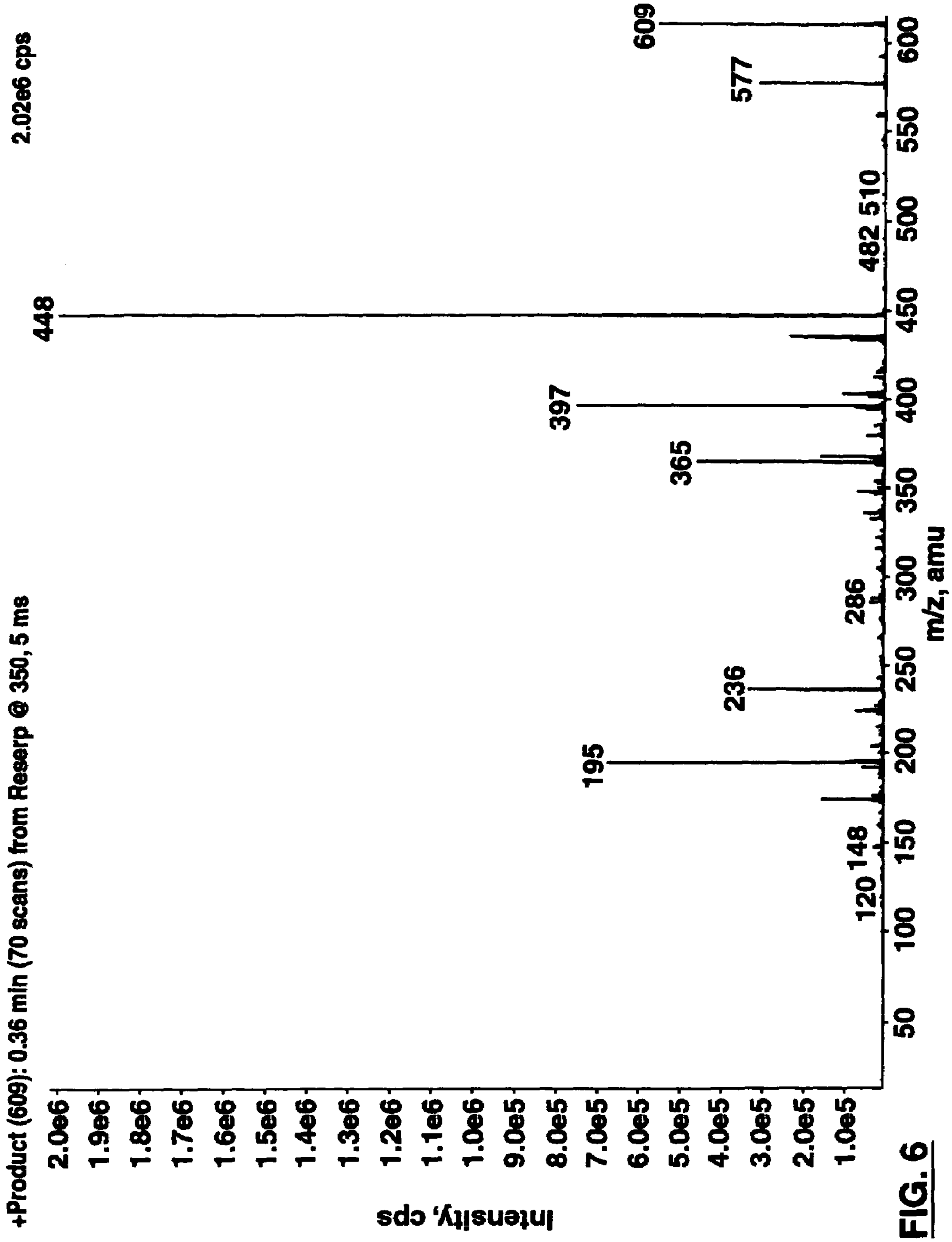
FIG. 6 is a further MS/MS spectrum of m/z 609 reserpine molecular ion with a different fill mass and fill time.
Figure 7:
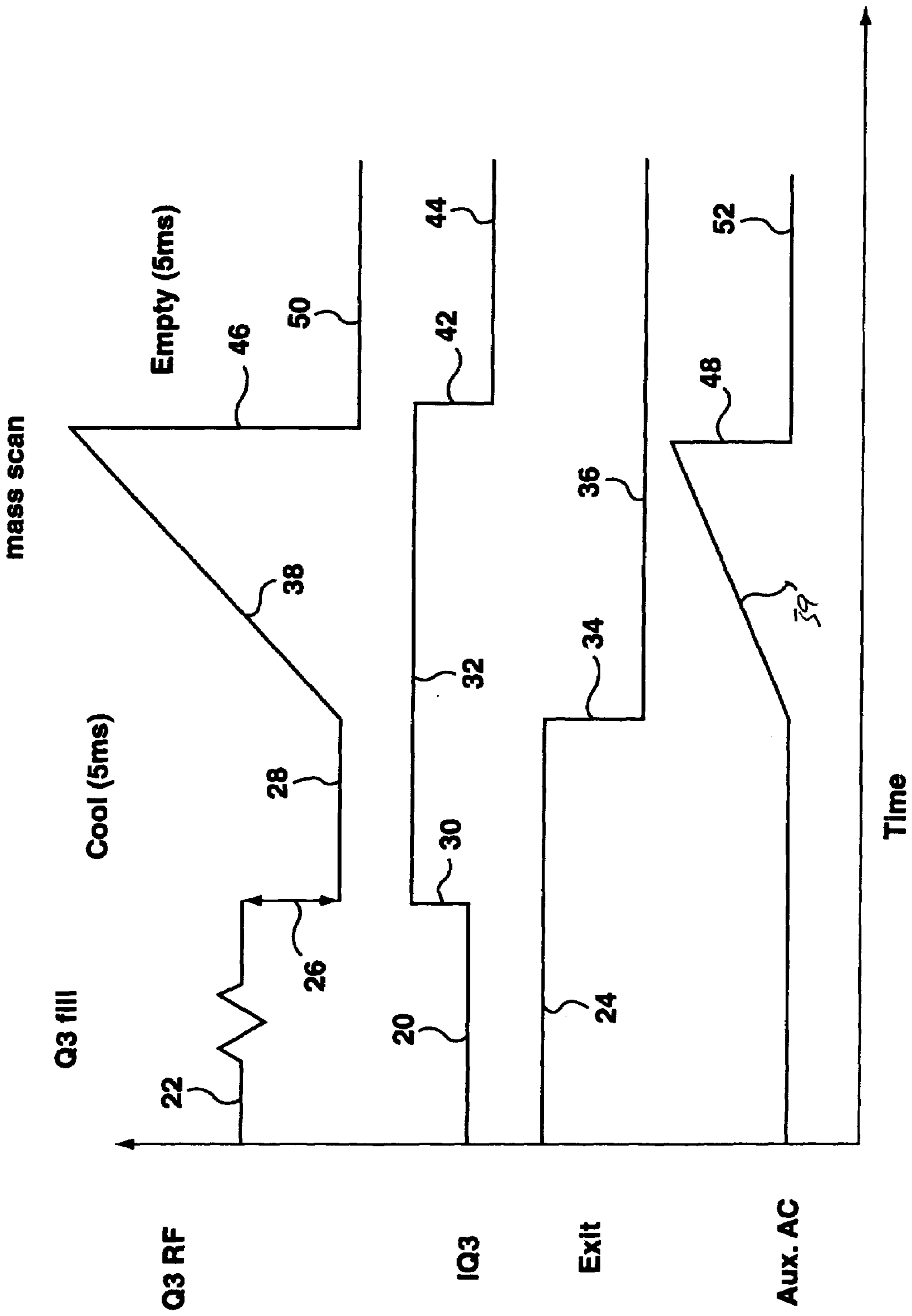
FIG. 7 is a scan function which displays the timing of the various steps used to generate Q2-to-Q3 MS/MS spectra.

It is necessary to consider the details of the scanning procedure to understand the reason for the appearance of the low mass-to-charge product ions in the FIG. 6 mass spectrum. The particular scan function employed here is shown in FIG. 7, which shows the timing steps from the Q3 fill step onward. During the Q3 fill step the value of IQ3 is set to allow ions to flow from Q2 into Q3, as indicated at 20. Simultaneously, an RF voltage 22 is supplied to the rod set Q3. The value of the Q2 to Q3 DC voltage rod offset (not shown in FIG. 7) is simultaneously adjusted to the value of the desired laboratory reference frame collision energy. The exit lens 45 is provided with a high voltage, indicated at 24, during the Q3 fill step, so as to provide an appropriate trapping voltage. The drive RF voltage 20, and thus Q3 fill mass, is set to some optimum value during the Q3 fill step, and at the end of the fill step, is then rapidly changed (in less than 100 microseconds as indicated at 26) to an RF voltage 28 to be used at the beginning of the mass scan.

As indicated at 30, at the end of the fill time, the voltage on the interquad aperture IQ3 is increased to a potential indicated at 32. Simultaneously, the voltage on the exit lens 45 is maintained, so that Q3 then acts as an ion trap.

At the end of the Q3 fill time, the voltage on the exit lens 45 is dropped as indicated at 34 to a voltage 36, and both the RF voltage and the AC excitation voltage for Q3 are ramped up as shown at 38 and 40, respectively. This then provides a mass spectrum of the ions trapped in the Q3 linear ion trap. At the end of the scanning phase the voltage at IQ3 drops at 42 to a lower voltage 44. Simultaneously, the RF and AC voltages are dropped as shown at 46 and 48 respectively, to final voltages 50 and 52.

The inventor has found that a very important factor influencing whether or not ions with mass-to-charge ratios below that of the Q3 fill mass are observed is the duration of the Q3 fill step, i.e. the Q3 fill time up to the voltage changes indicated at 26 and 30 in FIG. 7. This is shown by the differences between the product ion mass spectra for the protonated reserpine molecular ion at m/z 609 in FIGS. 5 and 6. The only differences between the spectra are the Q3 fill time which is 50 ms (i.e. 2 ms Q2-to-Q3 transfer time and 48 ms delay time) for FIG. 5 and 5 ms (i.e. 2 ms Q2-to-Q3 transfer time and 3 ms delay time) in FIG. 6, all other parameters are the same: Q2-to-Q3 acceleration energy=35 volts and Q3 fill mass=350.

It is believed that the reason for the observation of ions with q-values seemingly greater than the first stability region limit of ~0.908 is the unique Q2-to-Q3 fragmentation environment. The pulse of ions was introduced into the Q3 linear ion trap at a translational energy of 35 $eV_{lab}$. Since the neutral gas pressure within Q3 is relatively low, approximately $3\times10^{-5}$ torr, the corresponding collision frequency is also low. Thus, in a short time frame there will be few momentum dissipating collisions within Q3, at least compared to the conventional high pressure collision cell (B. A. Thomson et al. Anal. Chem. 1995, 34, 1696–1704). A considerable amount of translational kinetic energy will remain in any unfragmented precursor ions after a short Q3 fill time of 5 ms. The end of the Q3 fill period is marked by a rapid reduction in the Q3 RF voltage at 26, i.e. a reduction in the lowest m/z ion that is now stable within the Q3 linear ion trap. If any precursor ion within the Q3 ion trap has retained sufficient internal energy, it may collide with a neutral gas atom or molecule to produce a product ion with a q-value that falls within the first stability region defined by the RF voltage during the cooling portion (shown at 28 in the FIG. 7 timing diagram), this product ion can be trapped and detected during the subsequent mass scan. The presence of low mass product ions in the 5 ms Q3 fill time spectrum in FIG. 6 is clear evidence that sufficient energy was retained by the precursor ion population trapped within the Q3 ion trap, so that when the RF voltage was reduced in the "cooling time" step, these precursor ions could provide efficient fragmentation and the fragment ions would then be stable in Q3. In contrast, the 50 ms Q3 fill time spectrum in FIG. 5, shows that the amount of energy dissipated between the time ions are injected into Q3 and the time when the Q3 RF voltage is reduced to the lower level of the cool step is too long for a sufficient number of precursor ions to retain a high enough kinetic energy for the production of fragment ions. Also, if any fragment/product ions are generated during the fill time, the higher mass cutoff will cause them to be rejected. Consequently, with a long delay time, the precursor ions have experienced enough collisions within the Q3 linear ion trap to preclude the formation of any significant quantity of low mass-to-charge product ions of reserpine. Thus, this method allows one to vary the average amount of internal energy deposited into a precursor ion and more significantly retained until the start of the cooling step when the lighter ions will be stable within Q3. This variation is effected simply by changing the delay time between the 2 ms Q2-to-Q3 transfer time and the time at which the Q3 RF amplitude is reduced, terminating the Q3 fill time and starting the cooling time.

Figure 8:
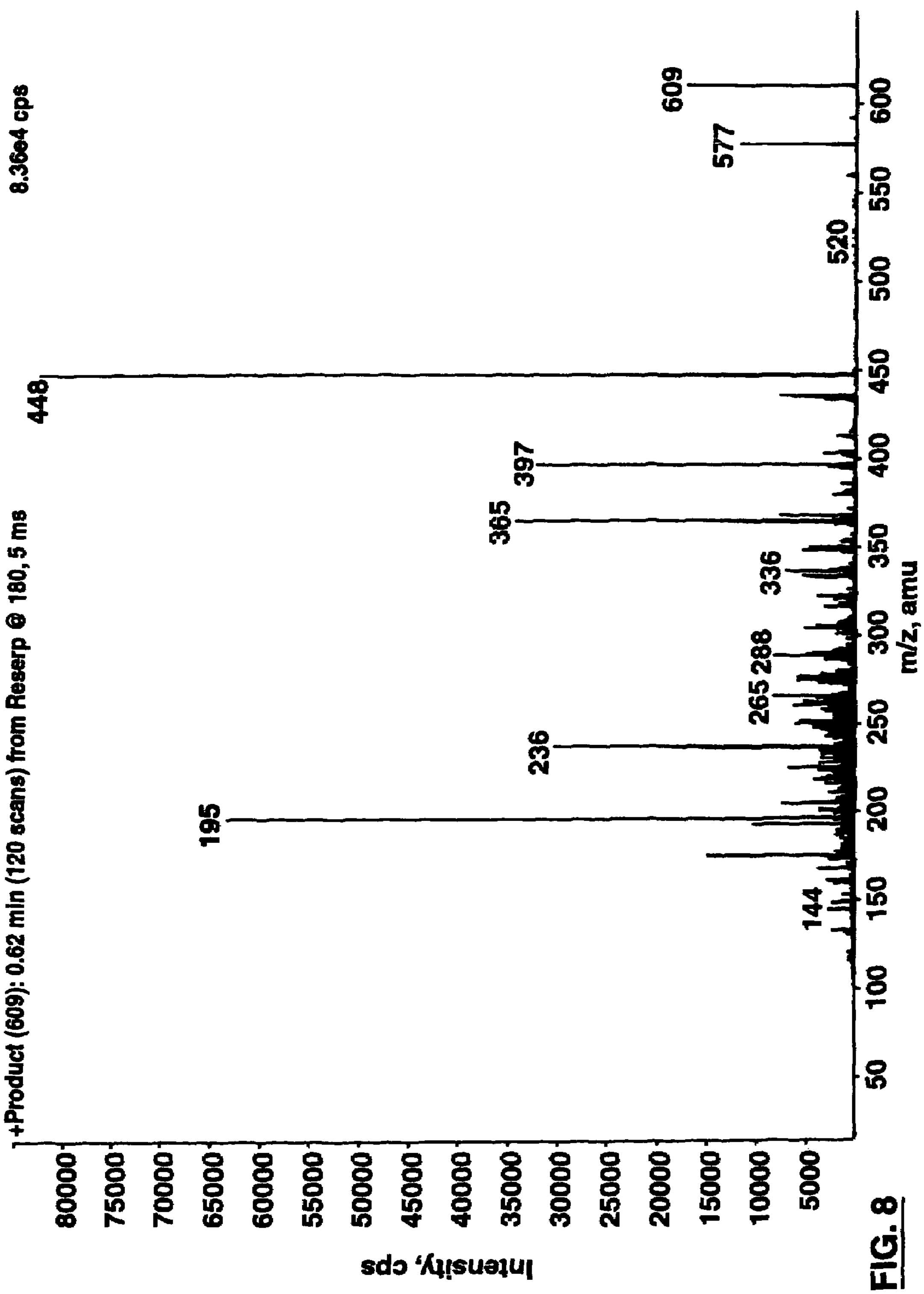
FIG. 8 is another MS/MS spectrum of m/z 609 reserpine molecular ion with a different fill mass and fill time.

One advantage to operating the instrument with a high Q3 fill mass is a higher intensity product ion mass spectrum relative to that obtained with a low Q3 fill mass. FIG. 8 shows the product ion mass spectrum of the protonated reserpine ion at m/z 609 obtained with a Q3 fill mass of 180. Comparison of this mass spectrum with that in FIG. 6 (which was obtained under the same conditions except that the Q3 fill mass was 350) shows that the higher Q3 fill mass of 350 results in a sensitivity increase of about 20×. The increased in sensitivity for the Q3 fill mass of 350 mass spectrum is likely due to a larger radial well depth that better confines any scattered ions during the Q3 fill step. Intensity is maximized when the Q3 fill mass is approximately ½ that of the precursor ion mass-to-charge ratio, although the optimization characteristics are broad.

A further advantage to the use of an elevated Q3 fill mass is that the ions with m/z<Q3 fill mass are produced at a later time (after the cooling time) than those with m/z>Q3 fill mass, as they are products of precursor ions with lower kinetic energy since some collisional relaxation of the precursor ion during the delay time. That is, the energy of the precursor ion has been reduced by some of the relatively infrequent collisions within Q3 during the fill time. Thus consecutive fragmentation processes producing these ions with m/z<Q3 fill mass are less favoured since the precursor ion has less internal energy at the time at which the lower mass product ions are collected. The resulting product ions in turn have less internal energy and thus reduced probability of further fragmentation, leading to suppression of second generation product ion precursor-to-product ion pairs. This can make it easier to identify first generation precursor-to-product ion pairs, which can be especially useful in the identification and differentiation of different dissociation pathways.

Figure 9:
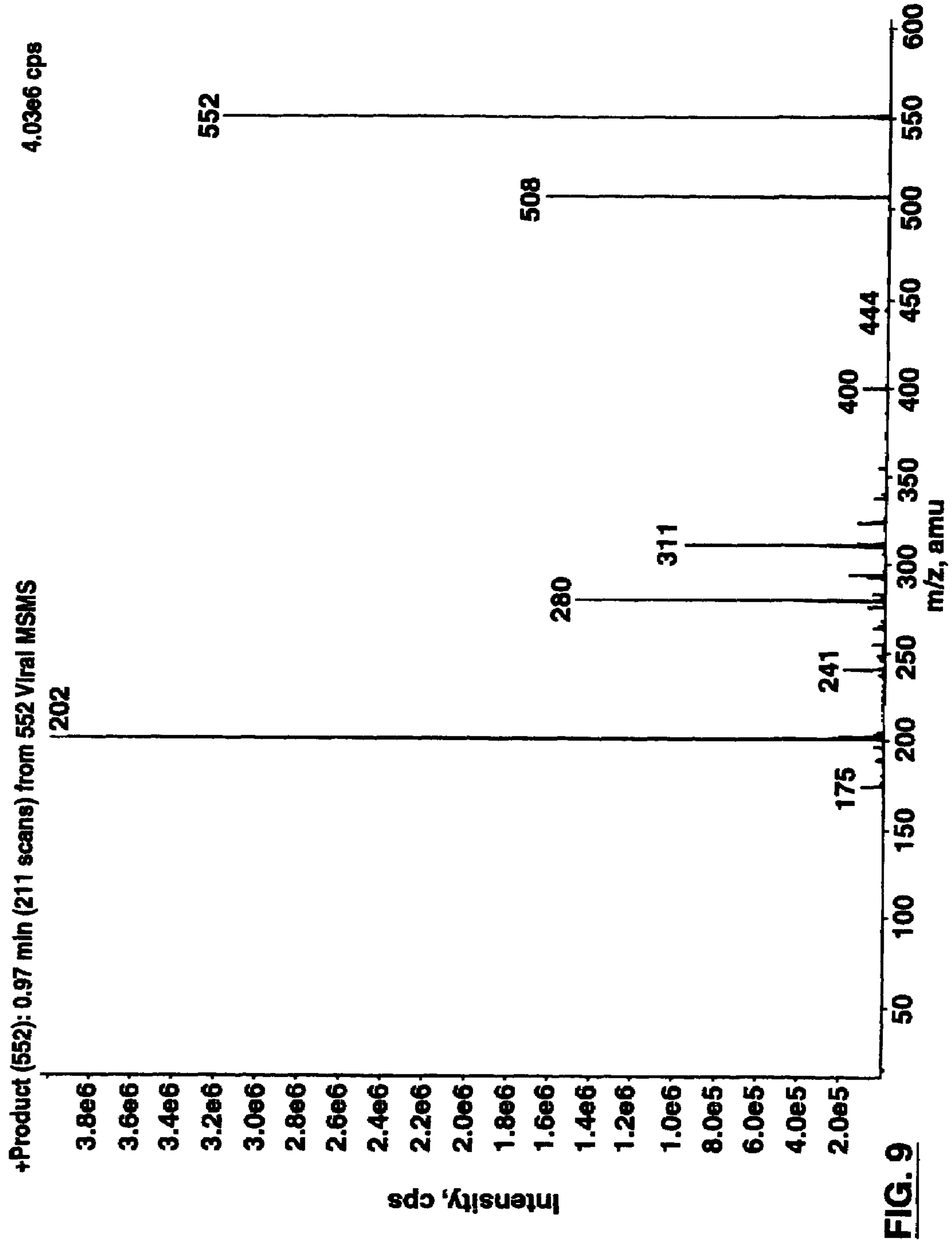
FIG. 9 is an MS/MS spectrum of the m/z 552 bosentan molecular ion obtained using conventional acceleration into the collision cell.

An example is the mapping of the product ions of bosentan studied by Hopfgartner et.al. (J. Mass Spectrom. 1996, 31, 69–76). Hopfgartner et. al. found that the major m/z 280 product ions ion in the product ion spectrum of the m/z 552 bosentan molecular ion does not arise directly from the molecular ion, but rather from a two step process involving fragmentation of the m/z 508 ion to the m/z 311 ion and finally to the m/z 280 product ion. The product ion mass spectrum of the m/z 552 molecular ion is displayed in FIG. 9. This spectrum was obtained by mass selecting the m/z 552 precursor ion with Q1 and accelerating this ion into the conventional Q2 collision cell and trapping the resultant product and residual precursor ions in the Q3 linear ion trap, from which they were mass selectively scanned out. This mass spectrum is virtually identical with that reported by Hopfgartner et al. Note the strong product ion feature at m/z 280.

A product ion mass spectrum for bosentan was obtained using the method described herein. Once again the precursor ion was mass selected by Q1 and then, in accordance with the present invention, it was introduced into and trapped within Q2, this time at low energy in order to eliminate fragmentation. Next, the ions trapped within Q2 were accelerated into the Q3 linear ion trap at a laboratory collision energy of 30 eV, a Q3 fill mass of 400, and a Q3 fill time of 5 ms (i.e. 2 ms transfer time and 3 ms delay time). Thus, the only product ions that would be stable during the 5 ms fill time in the Q3 ion trap have m/z>400. Immediately after the Q3 fill time (at 26 in FIG. 7) the Q3 RF voltage was reduced to that corresponding to m/z 100, which would allow trapping of any product ions with m/z<400. As the delay time is short, precursor ions and first generation fragment ions should have retained sufficient energy, to collide and fragment, forming lighter ions which are now stable. The result is a somewhat different product ion mass spectrum from the one in FIG. 10, in that the relative intensity of the m/z 280 product ions ion is significantly reduced from that in FIG. 9.

Figure 10:
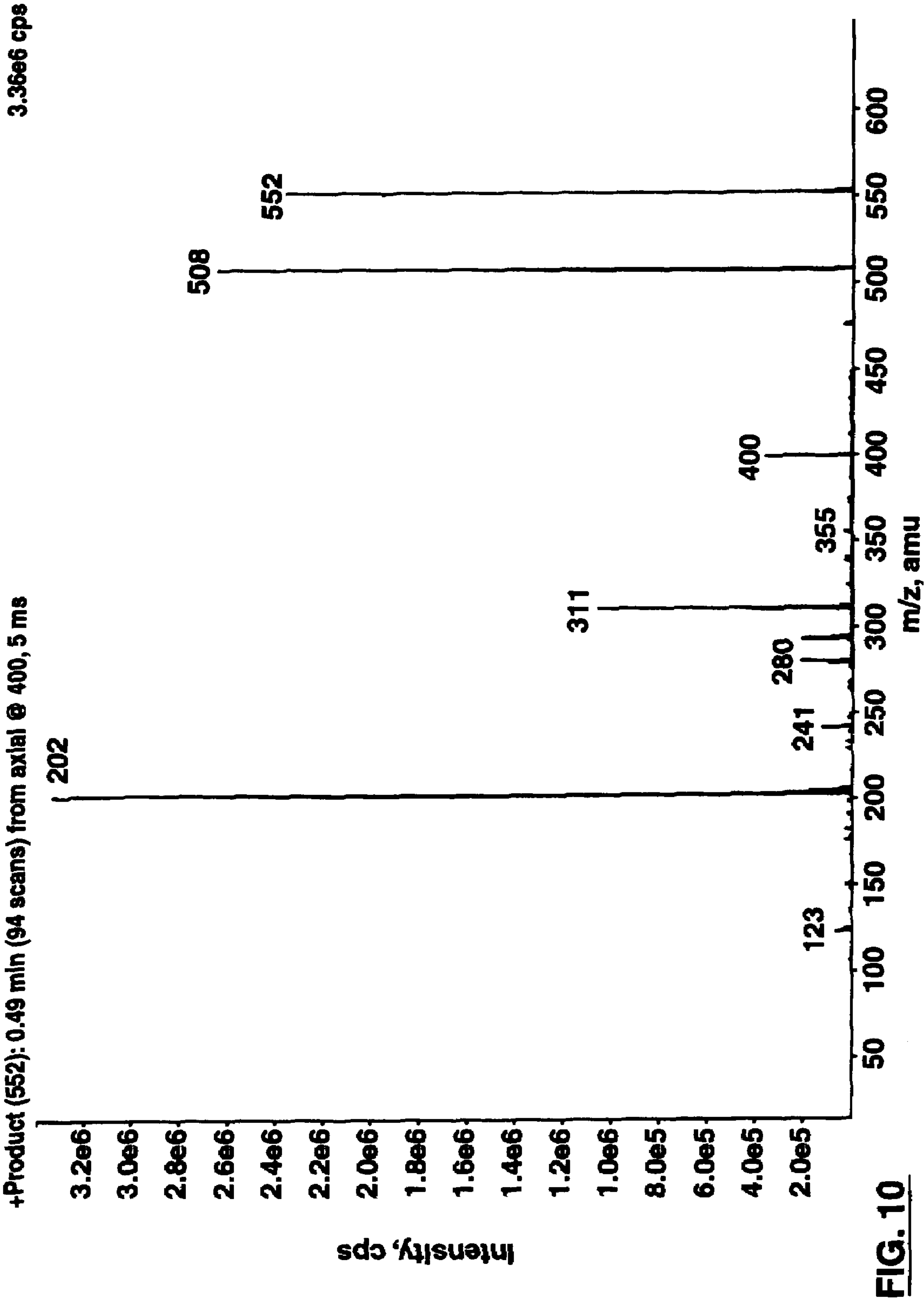
FIG. 10 is an MS/MS spectrum of the m/z 552 bosentan molecular ion obtained with different acceleration conditions, and with a different fill mass and fill time.
Figure 11:
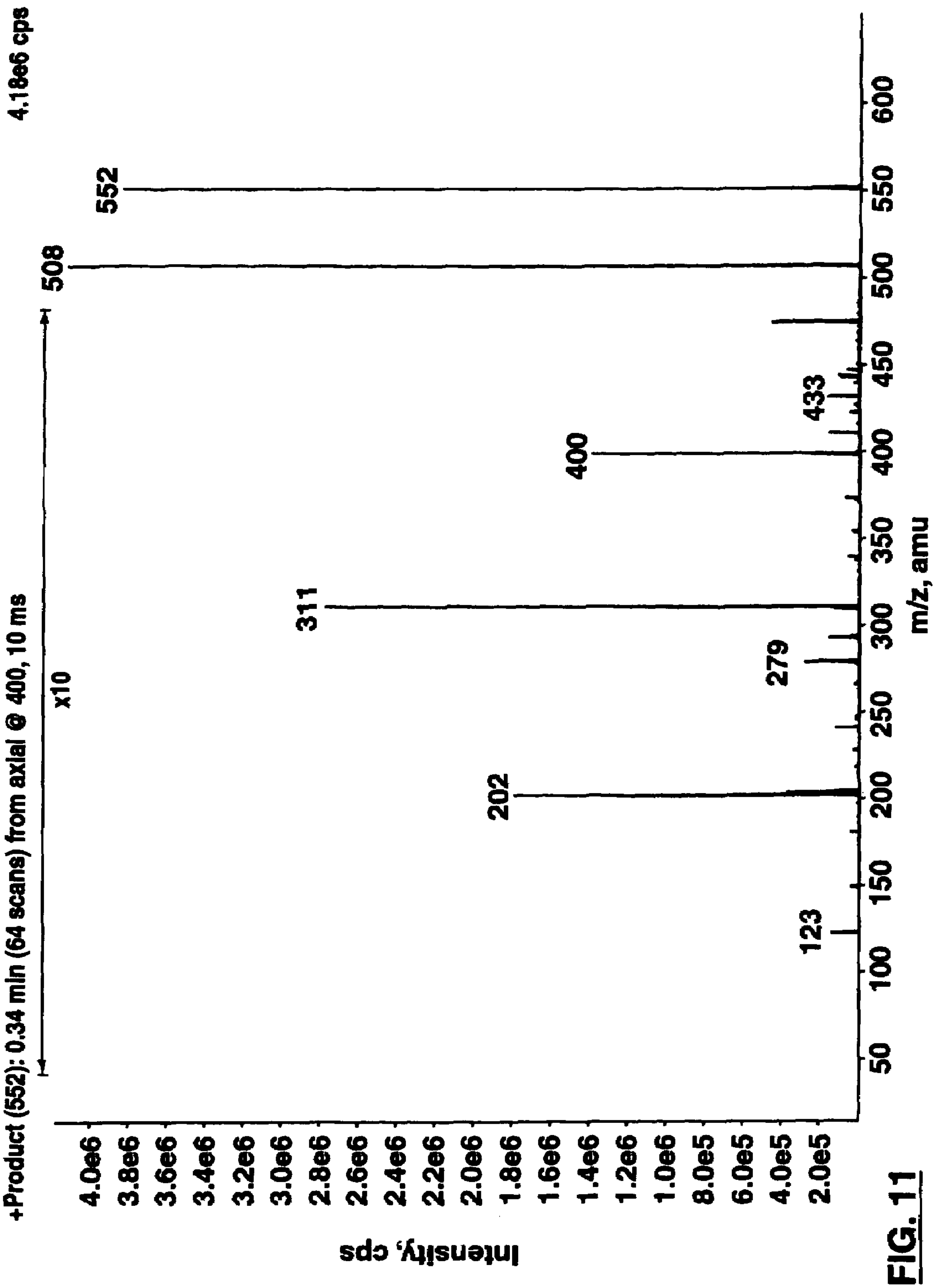
FIG. 11 is an MS/MS spectrum of the m/z 552 bosentan molecular ion obtained with the same acceleration condition as FIG. 10, and with a different fill time and fill mass.

The product ion mass spectrum of the m/z 552 bosentan molecular ion obtained with the Q3 fill mass set at 400 for a 10 ms fill time (i.e. 2 ms transfer time and 8 ms delay time) is displayed in FIG. 11, with the conditions otherwise being the same as in FIG. 10. The additional 5 ms spent at the Q3 fill mass has a profound effect on the mass spectrum. This increased delay time allows the precursor ions time to dissipate some energy; thus residual precursor ions and first generation fragments, after commencement of the cooling time with the broader stability band, are much less likely to have sufficient energy for further fragmentation to occur. Most of the same product ions ion peaks are still distinguishable, but at much reduced intensity below the fill mass; note that intensities in the mass range to <m/z 480 are shown magnified by a factor of 10. Notable also is that the mass spectrum shows virtually complete elimination of the m/z 280 product ions ion peak. This is strong evidence that the m/z 280 product ions ion is a secondary fragmentation product, or has a higher appearance energy (i.e. requiring a precursor ion to have a high energy than other product ions ions <m/z 400. These results are in agreement with those of Hopfgartner et. al.

The only limitation for the use of a variable Q3 fill mass is that the precursor ion must be stable within the Q3 linear ion trap, so the Q3 fill mass must be less than the mass-to-charge ratio of the precursor ion.

Figure 12A:
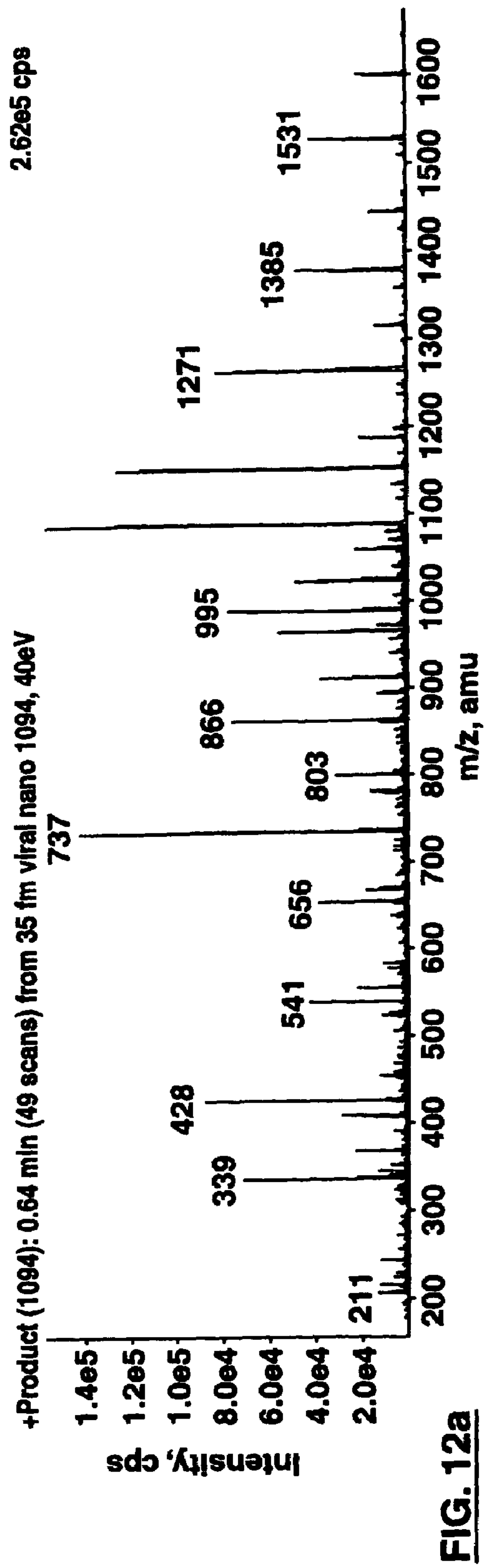
FIG. 12 shows MS/MS spectra of the doubly charged m/z 1094 ion from beta-casein digested by the enzyme trypsin obtained (a) by normal acceleration into the collision cell and (b) by acceleration out from the collision cell.
Figure 12B:
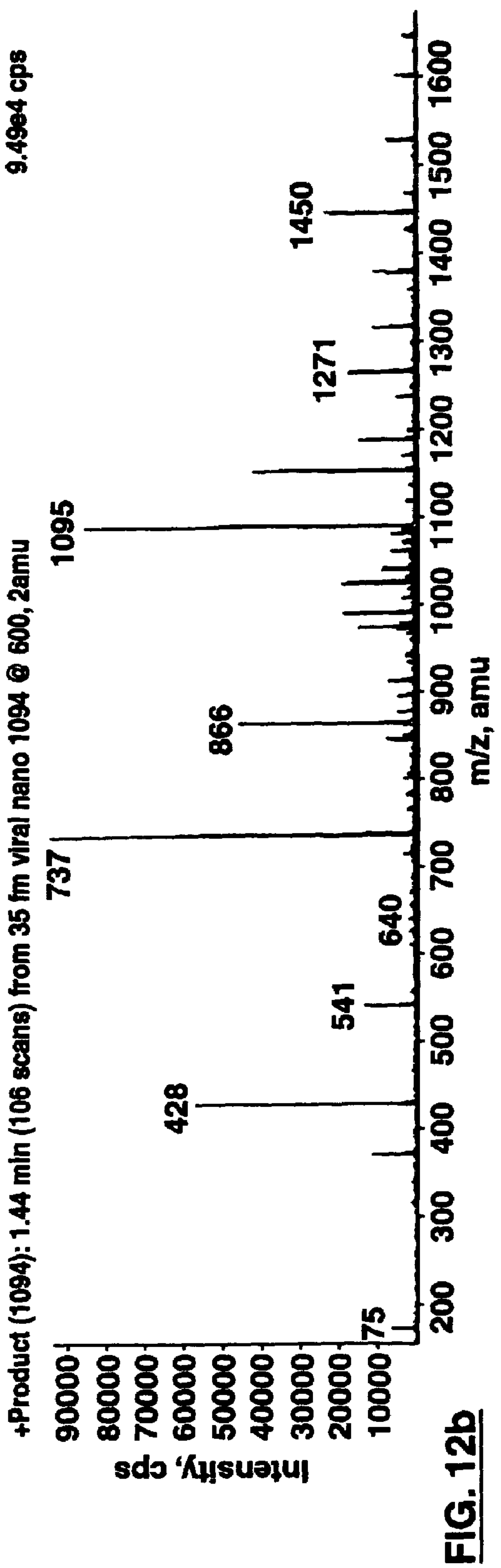
Figure 13A:
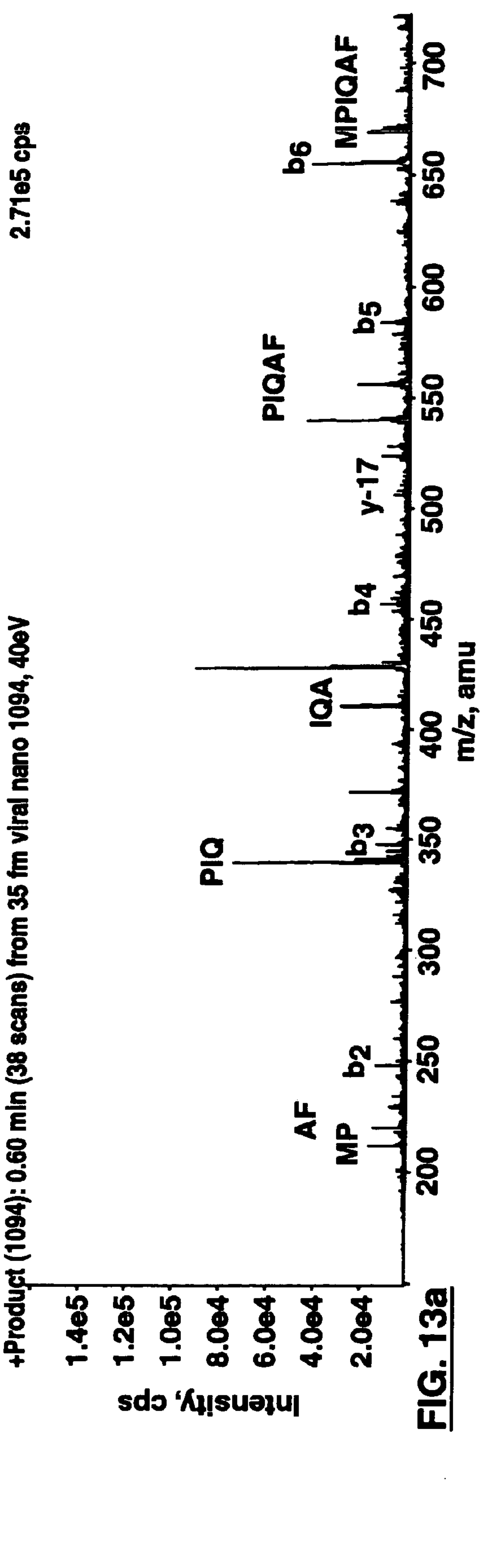
FIG. 13 shows mass-to-charge scale expanded views of the same MS/MS spectra of the doubly charged m/z 1094 ion from beta-casein digested by the enzyme trypsin obtained (a) by normal acceleration into the collision cell and (b) by acceleration out from the collision cell.
Figure 13B:
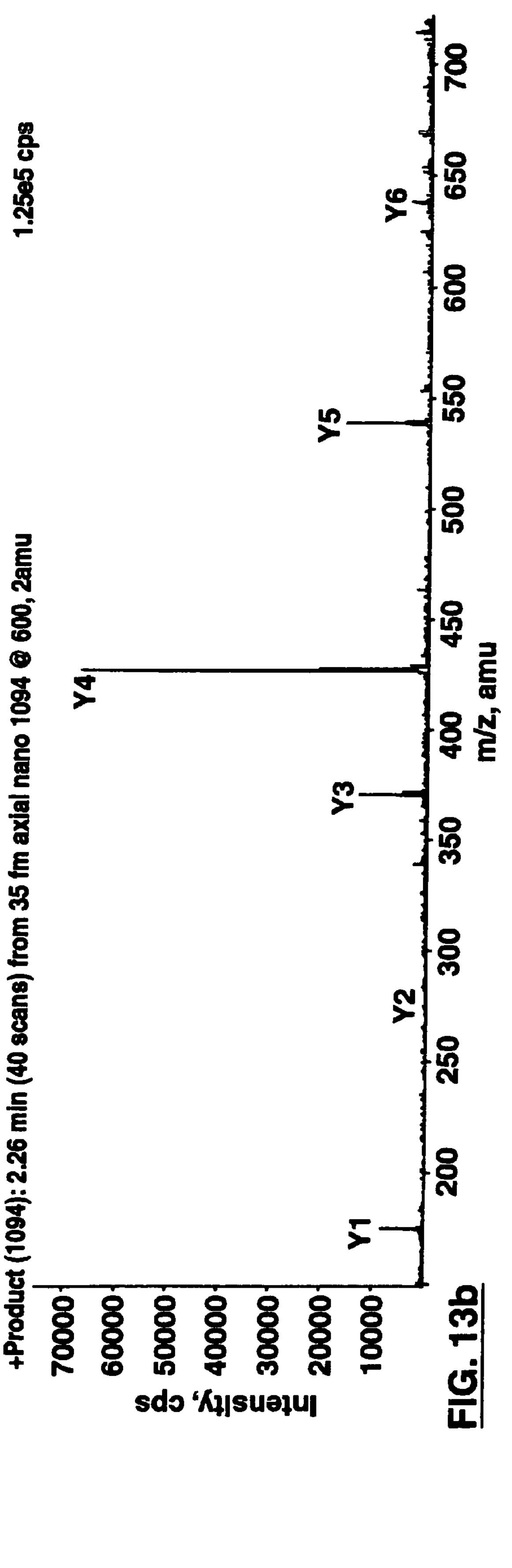

This method has also been found to be useful for the simplification of peptide product ion spectra as is demonstrated in FIG. 12. This figure displays two product ion spectra of a doubly charged peptide product ions at m/z 1094 from digestion of beta-casein in the presence of trypsin. FIG. 12*a* is the optimized product ion spectrum using conventional Q1-to-Q2 acceleration and generation of fragment ions in the Q2 collision cell with subsequent mass analysis using the Q3 linear ion trap. The resulting spectrum is particularly rich in the low mass-to-charge region due to the presence of sequential fragmentation and internal product ions products. FIG. 12*b* is a Q2-to-Q3 acceleration product ion mass spectrum of the doubly charged m/z 1094 ion from the same beta casein sample, i.e. with ions passed through Q2 with substantially no fragmentation. FIG. 12*b* was obtained with a Q3 fill mass of 600 and a Q3 fill time of 7 ms. The two spectra are similar, however FIG. 12*b* is much less congested in the region below the Q3 fill mass. FIG. 13 shows an expanded view of the lower mass-to-charge region of these product ion spectra. The assignments of the mass peaks in the product ion spectra have been included. FIG. 13*b* was obtained using the Q2-to-Q3 acceleration method show only y-ions in this mass-to-charge region. The standard Q1-to-Q2 acceleration data in FIG. 13*a* displays the same y-ions and many other fragmentation products including b-ions and internal product ions. The congestion in FIG. 13*a* makes identification of sequence specific product ions difficult if not impossible. However FIG. 13*b* contains only sequence specific y-ions. The discrimination against b-ion products and those resulting from internal fragmentation pathways has been found to be general phenomenon for Q2-to-Q3 acceleration collisional dissociation of peptides resulting from trypsin digestion using an elevated Q3 fill mass.

The technique of ion isolation within a nominally RF-only collision cell and subsequent ion acceleration with concomitant fragmentation is also applicable to other Qq(MS) (where Q designates the mass selection step via a conventional RF/DC resolving quadrupole mass spectrometer and q the higher pressure nominally RF-only collision cell, here carried out in Q1 and Q2 respectively) instruments, where the MS stage can be another fast scanning mass spectrometer other than a linear ion trap mass spectrometer. One such device is a QqTOF tandem mass spectrometer. The TOF is particularly well suited to be used for the final mass analyzer since it is best used with a pulsed ion source, which is what emerges from the collision cell. Furthermore, a full mass spectrum can be obtained for each ion pulse, giving better overall efficiency.

Additionally, it may in some circumstances be possible to eliminate the collision cell, and provide the collision gas by some other mechanism to the flow of ions into Q3. Additionally, the basic requirement for the section containing Q3 is that it will be a lower pressure section capable of collecting and collimating ions. It could include, for example, a multipole rod set that provides just this function without acting as a mass analyzer. Where it is desired to set a fill mass, the multipole rod set must be capable of defining this cut off mass with a required degree of precision. A mass analyzer can then be provided downstream.

The final step of mass analyzing the $MS^3$ fragment ions can also be carried out using other mass analyzers that yield full mass spectra for a single pulse of ions such as a 3-dimensional ion trap.

Figure 14:
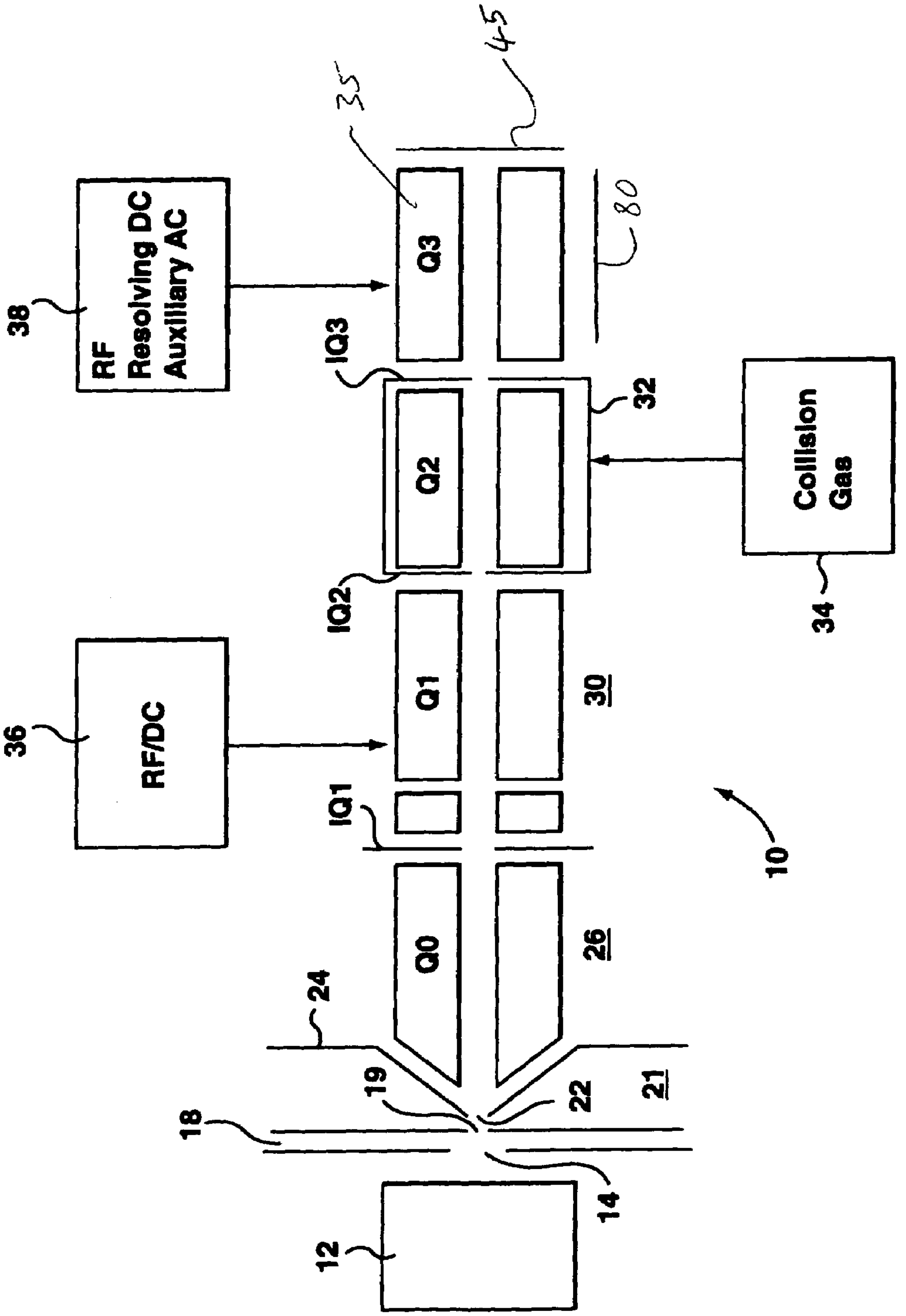
FIGS. 14 and 15 show schematically two embodiments of an apparatus in accordance with the present invention.
Figure 15:
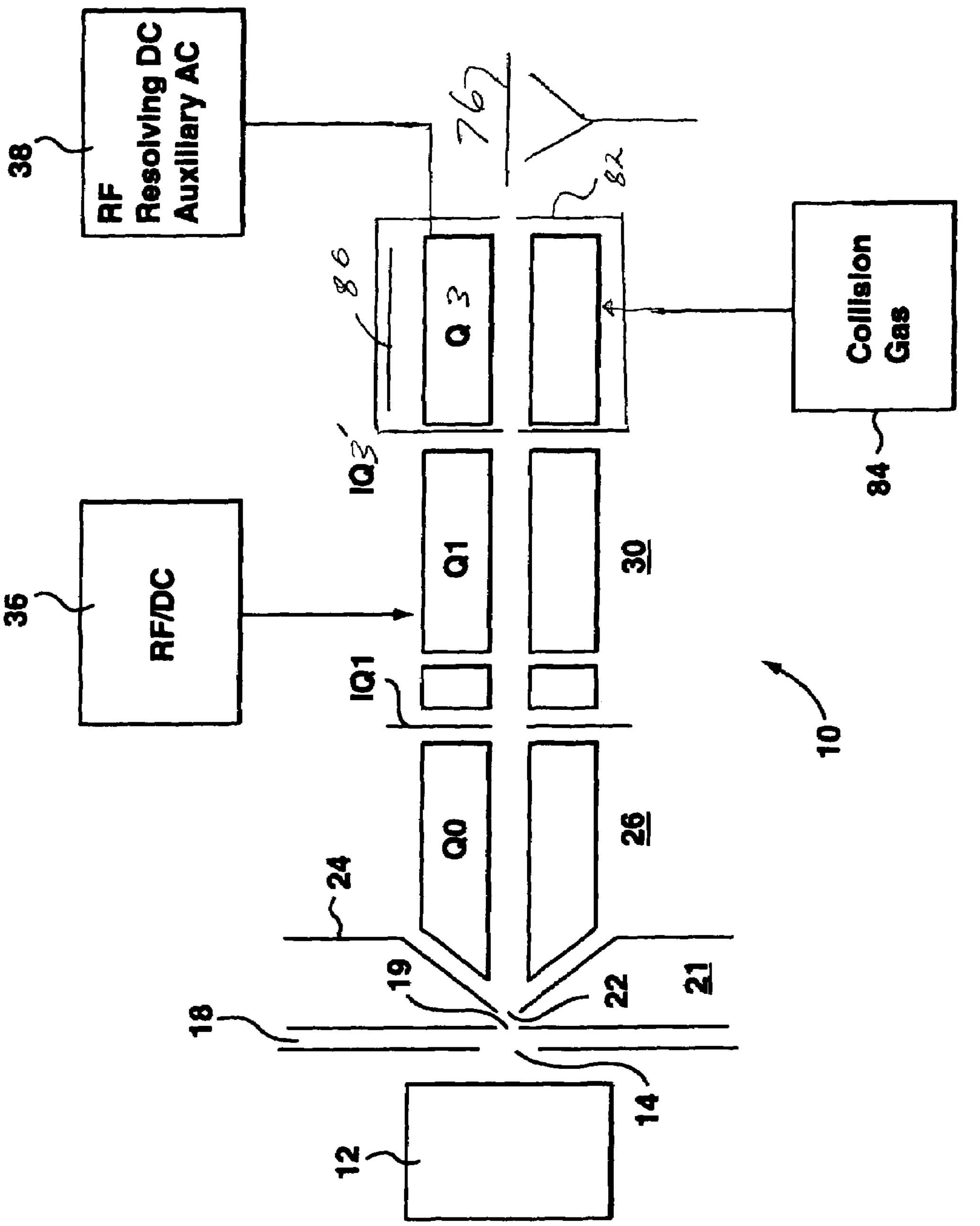

Reference will now be made to FIGS. 14 and 15, which show alternative embodiments of an apparatus in accordance with the present invention. FIG. 14 shows a modification of the apparatus of FIG. 1 including provision for radial ejection of ions and FIG. 15 shows an apparatus in which Q2 is omitted, and provision is made for collision gas to be supplied, in a known manner, to final quadrupole rod set Q3, which is enclosed in a collision cell.

Referring first to FIG. 14, the detector 76 of FIG. 1 is omitted, and instead a detector 80 is provided for detecting ions that are ejected radially. The exit lens 45 is retained, but it will be understood that it need not be of identically the same configuration as FIG. 1. In this FIG. 14 configuration, the exit lens 45 serves to provide a barrier to prevent axial ejection or scanning of ions, and hence it is expected that a different configuration of a lens 45 will be provided.

The detector 80 can be in accordance with the provisions of U.S. Pat. No. 5,420,425, mentioned above, and is arranged to detect ions that are ejected radially. Thus, this configuration of FIG. 14 permits ions to be scanned out radially.

Turning to FIG. 15, here, the detector 76 is retained. However, the rod set Q2 is omitted.

Instead, an interquad aperture IQ3' is retained at the exit of Q1, and provides an interface between Q1 and the quadrupole rod set Q3 that is retained. A power supply 38, for RF, resolving DC and auxiliary AC is provided, connected to the quadrupole Q3. The interquad aperture IQ3' is part of a collision cell enclosing the rod set Q3, Thus, the rod set Q3 is configured so that a relatively high pressure can be generated therein in order to affect fragmentation of the precursor ions. For this purpose, a collision gas source 84 is provided. It is shown schematically connected to the collision cell. The collision gas then may be removed, by known conventional methods, so that a relatively low pressure can be generated. The primary fragment ions and any residual precursor ions may be trapped in the collision cell, and primary fragment ions having a desired mass to charge ratio then may be selected while other ions are rejected. The selected ions may be scanned out of Q3 either radially or axially.

For axial scanning, an exit lens 82 would be provided, and a detector, again indicated at 76, would be used to detect ions scanned out axially. However, alternatively, for radial scanning some sort of exit lens or barrier would be provided to prevent loss of ions axially, as indicated in the FIG. 14 embodiment. The detector 86, would be used to detect ions scanned out radially. It may be provided either within the collision cell or external to the collision cell. It is generally understood that if the detector would be external to the collision cell, the pressure within the collision cell would have to be appropriately maintained for proper operation of the collision cell, in both the collision mode and for subsequent trapping and scanning. Simultaneously, any lens or the like must permit ions to escape from the collision cell with acceptable efficiencies during scanning.

The invention claimed is:

1. A method of analyzing a substance, the method comprising:

(1) ionizing the substance to form a stream of ions;

(2) subjecting the ion stream to a first mass analysis, to select ions having a desired mass to charge ratio, as precursor ions;

(3) introducing the precursor ions into a collision cell to promote fragmentation of the precursor ions, thereby to generate primary fragment ions;

(4) in the collision cell, selecting primary fragment ions having a desired mass to charge ratio, and rejecting other ions;

(5) accelerating the selected primary fragment ions from the collision cell into a downstream linear ion trap mass analyzer, thereby to promote secondary fragmentation; and (6) scanning ions out of the downstream linear ion trap mass analyzer by a radial ejection technique to generate a mass spectrum.

2. A method as claimed in claim 1, wherein step (3) comprises accelerating the precursor ions into the collision cell, to promote fragmentation by collision with the gas.

3. A method as claimed in claim 1, wherein selection of the primary fragment ions in step (4) comprises removing ions of a mass to charge ratio greater than the mass to charge ratio of the selected primary fragment ions and separately removing ions with a mass to charge ratio less than the mass to charge ratio of the selected primary fragment ion, the removal of the ions with mass to charge ratios higher and lower than the mass to charge ratio of the selected primary fragment ion being effected in either order.

4. A method as claimed in claim 3, which includes effecting removal of primary fragment ions with mass to charge ratios greater and less than the mass to charge ratio of the selected primary fragment ion in the collision cell.

5. A method as claimed in claim 4, which includes trapping the primary fragment ions and any residual precursor ions in the collision cell, during step (4).

6. A method as claimed in claims 1, 2, 3, 4 or 5, which includes effecting step (6) by scanning ions out of the downstream linear ion trap mass analyzer by an axial ejection technique.

7. A method of analyzing a substance, the method comprising:

(1) ionizing the substance to form a stream of ions;

(2) subjecting the ion stream to a first mass analysis, to select ions having a desired mass to charge ratio, as precursor ions;

(3) introducing the precursor ions into a collision cell to promote fragmentation of the precursor ions, thereby to generate primary fragment ions;

(4) in the collision cell, selecting primary fragment ions having a desired mass to charge ratio, and rejecting other ions by removing ions of a mass to charge ratio greater than the mass to charge ratio of the selected primary fragment ions and separately removing ions with a mass to charge ratio less than the mass to charge ratio of the selected primary fragment ion, the removal of the ions with mass to charge ratios higher and lower than the mass to charge ratio of the selected primary fragment ion being effected in either order;

(5) accelerating ions from the collision cell into a downstream mass analyzer, thereby to promote secondary fragmentation; and (6) scanning ions out of the downstream mass analyzer by a radial ejection technique.

8. A method as claimed in claim 7, wherein step (3) comprises accelerating the precursor ions into a collision cell, to promote fragmentation by collision with the gas.

9. A method of analyzing a substance, the method comprising:

(1) ionizing the substance to form a stream of ions;

(2) subjecting the ion stream to a first mass analysis, to select ions having a desired mass to charge ratio, as precursor ions;

(3) accelerating the precursor ions into a relatively high pressure section to promote fragmentation of the precursor ions, thereby to generate primary fragment ions;

(4) providing a multipole rod set in the high pressure section, for at least promoting collection and focusing of ions received therein, and providing at least an RF voltage to the multipole rod set to focus ions.

(5) trapping the ions in the multipole rod set, and scanning ions out radially from the multipole rod set to subject the fragment ions to a second mass analysis, to generate a mass spectrum.

10. A method as claimed in claim 9, wherein (4) includes providing a quadrupole rod set as the multipole rod set, sod selling the q value of the quadrupole rod set to provide a high fill mass that is approximately that of the mass to charge ratio of a desired ion.

11. A method as claimed in claim 9, which includes providing the RF voltage during the fill step such that the q value of low ions is greater than q=0.9, to at least delay capture by the multipole rod set of ions with a low mass to charge ratio.

12. A method as claimed in claim 11, which includes selling the RF level to enhance sensitivity for ions of a desired mass to charge ratio.

13. A method as claimed in claim 11, which includes: providing the elevated RF level as a first RF voltage for pre-determined delay time, to cause the primary fragment ions to dissipate energy by collision with the collision gas, and then lowering the RF level to a second, lower RF voltage whereby lower m/z ions can be trapped.

14. A method as claimed in claim 13, which includes setting the delay time to reduce the energy of the primary fragment ions to a level sufficient to substantially suppress formation of secondary fragment ions, and subsequently reducing the RF level to the second, lower RF voltage for the second mass analysis of step (4).

15. A method as claimed in claims 11, 12, 13 or 14 which includes trapping ions in the multipole rod set and scanning ions out to effect the second mass analysis of step (4).

16. A method as claimed in claim 15, which includes progressively increasing at least one of a RF voltage and an AC voltage applied to the multipole rod set, to scan ions out of the multipole rod set radially.

17. A method as claimed in claim 15, which includes, after reducing the RF voltage to the second RF voltage, providing a cool time period, to enable any excess energy of the ions to dissipate by collision before effecting the second mass analysis of step (5), and effecting the second mass analysis by scanning ions out from the multipole rod set.

18. A method of analyzing a substance, the method comprising:

(1) ionizing the substance to form a stream of ions;

(2) subjecting the ion stream to a first mass analysis, to select ions having a desired mass to charge ratio, as precursor ions;

(3) introducing the precursor ions into a collision cell to promote fragmentation of the precursor ions, thereby to generate primary fragment ions;

(4) in the collision cell, selecting primary fragment ions having a desired mass to charge ratio, and rejecting other ions; and (5) radially scanning ions out of the collision cell to generate a mass spectrum.

19. A method as claimed in claim 18, wherein step (3) comprises accelerating the precursor ions into the collision cell, to promote fragmentation by collision with the gas.

20. A method as claimed in claim 18 or 19, wherein selection of the primary fragment ions in step (4) comprises removing ions of a mass to charge ratio greater than the mass to charge ratio of the selected primary fragment ions and separately removing ions with a mass to charge ratio less than the mass to charge ratio of the selected primary fragment ion, the removal of the ions with mass to charge ratios higher and lower than the mass to charge ratio of the selected primary fragment ion being effected in either order.

21. A method as claimed in claim 20, which includes effecting removal of primary fragment ions with mass to charge ratios greater and less than the mass to charge ratio of the selected primary fragment ion in the collision cell.

22. A method as claimed in claim 21, which includes trapping the primary fragment ions and any residual precursor ions in the collision cell, during step (4).

23. A method as claimed in claim 18 or 19, which includes effecting step (5) by axially scanning ions out of the collision cell.

* * * * *